United States Patent
Minami et al.

(10) Patent No.: US 7,121,238 B2
(45) Date of Patent: Oct. 17, 2006

(54) INTAKE VALVE CONTROL SYSTEM AND METHOD FOR INTERNAL COMBUSTION ENGINE

(75) Inventors: Yutaro Minami, Kanagawa (JP); Hiroshi Iwano, Kanagawa (JP); Hiraku Ooba, Yokohama (JP); Naonori Onoda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 459 days.

(21) Appl. No.: 10/763,416

(22) Filed: Jan. 26, 2004

(65) Prior Publication Data
US 2004/0216707 A1  Nov. 4, 2004

(30) Foreign Application Priority Data
Jan. 27, 2003 (JP) ............... 2003-017090
Nov. 18, 2003 (JP) ............... 2003-387476

(51) Int. Cl.
*F01L 1/14* (2006.01)

(52) U.S. Cl. ............... 123/90.15; 123/90.17; 123/347

(58) Field of Classification Search ........... 123/90.15, 123/90.16, 90.17, 90.18, 90.27, 90.31, 345, 123/346, 347, 348
See application file for complete search history.

(56) References Cited

U.S. PATENT DOCUMENTS 6,397,800 B1  6/2002  Nohara et al.
6,647,935 B1 *  11/2003  Aoyama et al. ......... 123/90.16

FOREIGN PATENT DOCUMENTS

JP  2001-263105 A  9/2001

\* cited by examiner

*Primary Examiner*—Thomas Denion
*Assistant Examiner*—Ching Chang
(74) *Attorney, Agent, or Firm*—Foley & Lardner LLP

(57) ABSTRACT

An intake valve control system for an internal combustion engine includes a first valve control mechanism for varying an actual operation angle of an intake valve, a second valve control mechanism for varying an actual maximum lift phase of the intake valve and a control unit that operates the first and second valve control mechanisms to adjust an intake air amount by controlling the operation angle predominantly in a low-intake range and controlling the maximum lift phase predominantly in a high-intake range. The control unit is configured to calculate a target operation angle and a target maximum lift phase according to engine operating conditions so that the actual operation angle and maximum lift phase are controlled to the target operation angle and maximum lift phase, respectively, and correct the target operation angle in a transient operating state where the actual maximum lift phase deviates from the target maximum lift phase.

20 Claims, 22 Drawing Sheets

INTAKE VALVE CONTROL SYSTEM AND METHOD FOR INTERNAL COMBUSTION ENGINE

BACKGROUND OF THE INVENTION

The present invention relates to an intake valve control system and method for an internal combustion engine.

Various types of intake valve control systems of internal combustion engines have been proposed to secure improved fuel economy and stable running performance during low-speed low-load engine operation and to secure sufficient power output with improved intake efficiency during high-speed high-load engine operation. Among others, Japanese Laid-Open Patent Publication No. 2001-263105 proposes an intake valve control system for an internal combustion engine, which includes an angle control mechanism for varying an operation angle of an engine intake valve and a phase control mechanism for varying a maximum lift phase of the intake valve. The angle and phase control mechanisms are operated independently of each other in accordance with engine operating conditions so as to control the operation angle and maximum lift phase to their respective target values and thereby adjust an intake air amount appropriately for improvements in fuel economy and power output.

SUMMARY OF THE INVENTION

In the above proposed intake valve control system, however, the operations of the angle and phase control mechanisms are delayed with respect to the respective target values at the time when the engine operating conditions suddenly change, e.g., when the engine load shifts from a low-load range to a high-load range at a relatively fast speed. The intake air amount deviates from its target value due to the operational delays of the angle and phase control mechanisms. The engine thus becomes low in torque response in such a transient operating state. At the time when the phase control mechanism is operated alone in order to adjust the intake air amount during middle/high-load engine operation, the torque response of the engine also becomes low transiently due to the operational delay of the phase control mechanism.

It is therefore an object of the present invention to provide an intake valve control system and method for an internal combustion engine, by which the operation angle and maximum lift phase of an engine intake valve can be controlled by means of valve control mechanisms, respectively, without causing deterioration in engine torque response even in a transient operating state where there arises a relatively large deviation between actual and target values of the maximum lift phase.

According to a first aspect of the invention, there is provided an intake valve control system for an internal combustion engine, comprising: a first valve control mechanism capable of continuously varying an actual operation angle of an intake valve; a second valve control mechanism capable of continuously varying an actual maximum lift phase of the intake valve; and a control unit that operates the first and second valve control mechanisms so as to adjust an intake air amount by controlling the operation angle predominantly in a low-intake range and by controlling the maximum lift phase predominantly in a high-intake range, the control unit being configured to: calculate a target operation angle and a target maximum lift phase in accordance with engine operating conditions so that the actual operation angle and the actual maximum lift phase are controlled to the target operation angle and the target maximum lift phase, respectively; and correct the target operation angle in a transient operating state where the actual maximum lift phase deviates from the target maximum lift phase.

According to a second aspect of the invention, there is provided a intake valve control system for an internal combustion engine, comprising: a first valve control mechanism capable of controlling an actual operation angle of an engine intake valve; a second valve control mechanism capable of controlling an actual maximum lift phase of the intake valve; means for calculating a static target operation angle and a target maximum lift phase in accordance with engine operating conditions, the static target operation angle varying predominantly over the target maximum lift phase in a low-intake range, the target maximum lift phase varying predominantly over the static target operation angle in a high-intake range; means for calculating a dynamic target operation angle from the static target operation angle in a transient operating state where the actual maximum lift phase deviates from the target maximum lift phase; means for selecting the dynamic target operation angle under as a final target operation angle under said transient operating state and setting the static target operation angle as a final target operation angle under a state other than said transient operating state; and means for operating the first and second valve control mechanisms so as to control the actual operation angle and the actual maximum lift phase to the final target operation angle and the target maximum lift phase, respectively.

According to a third aspect of the invention, there is provided an intake valve control method for an internal combustion engine, the engine having a first valve control mechanism capable of controlling an actual operation angle of an engine intake valve and a second valve control mechanism capable of controlling an actual maximum lift phase of the intake valve, the method comprising: calculating a static target operation angle and a target maximum lift phase in accordance with engine operating conditions, the static target operation angle varying predominantly over the target maximum lift phase in a low-intake range, the target maximum lift phase varying predominantly over the static target operation angle in a high-intake range; calculating a dynamic target operation angle from the static target operation angle in a transient operating state where the actual maximum lift phase deviates from the target maximum lift phase; selecting the dynamic target operation angle under as a final target operation angle under said transient operating state and setting the static target operation angle as a final target operation angle under a state other than said transient operating state; and operating the first and second valve control mechanisms so as to control the actual operation angle and the actual maximum lift phase to the final target operation angle and the target maximum lift phase, respectively.

The other objects and features of the present invention will also become understood from the following description.

DESCRIPTION OF THE EMBODIMENTS

Figure 1:
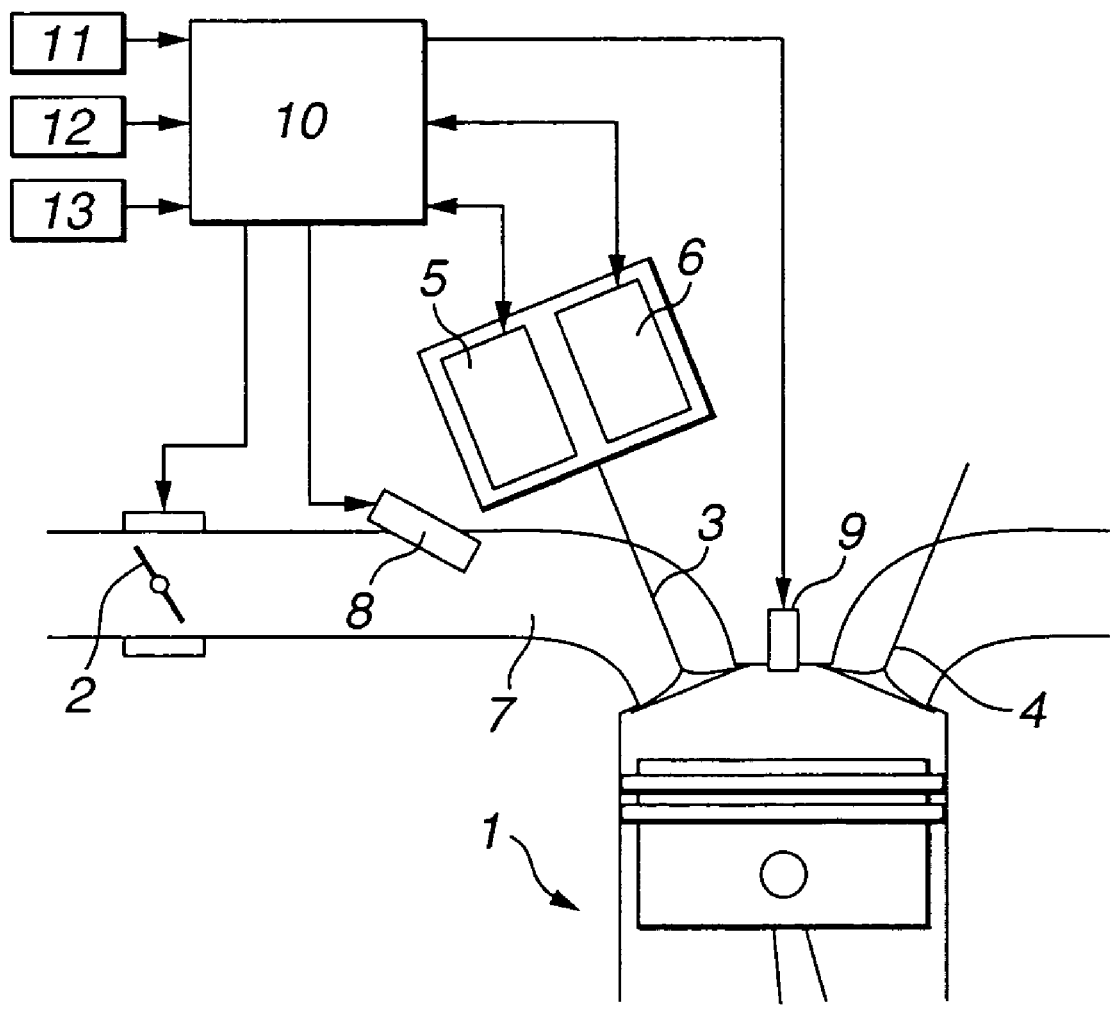
FIG. 1 is a schematic view of an intake valve control system of an internal combustion engine according to one exemplary embodiment of the present invention.

The present invention will be described below by way of first to fourth embodiments, in which like parts and portions are designated by like reference numerals to omit repeated descriptions thereof.

An intake valve control system of the first embodiment will be now explained with reference to FIGS. 1 to 11.

As shown in FIG. 1, engine 1 to which the present invention is applicable has intake valve 3, exhaust valve 4, first valve control mechanism (VEL) 5 capable of continuously increasing or decreasing an operation angle and valve lift of intake valve 3, second valve control mechanism (VTC) 6 capable of continuously advancing or retarding a maximum lift phase of intake valve 3, electronically-controlled throttle 2, fuel injection valve 8, spark plug 9, control unit 10 and various sensors. Herein, the maximum lift phase of intake valve 3 is indicated with respect to top dead center (TDC).

Figure 2:
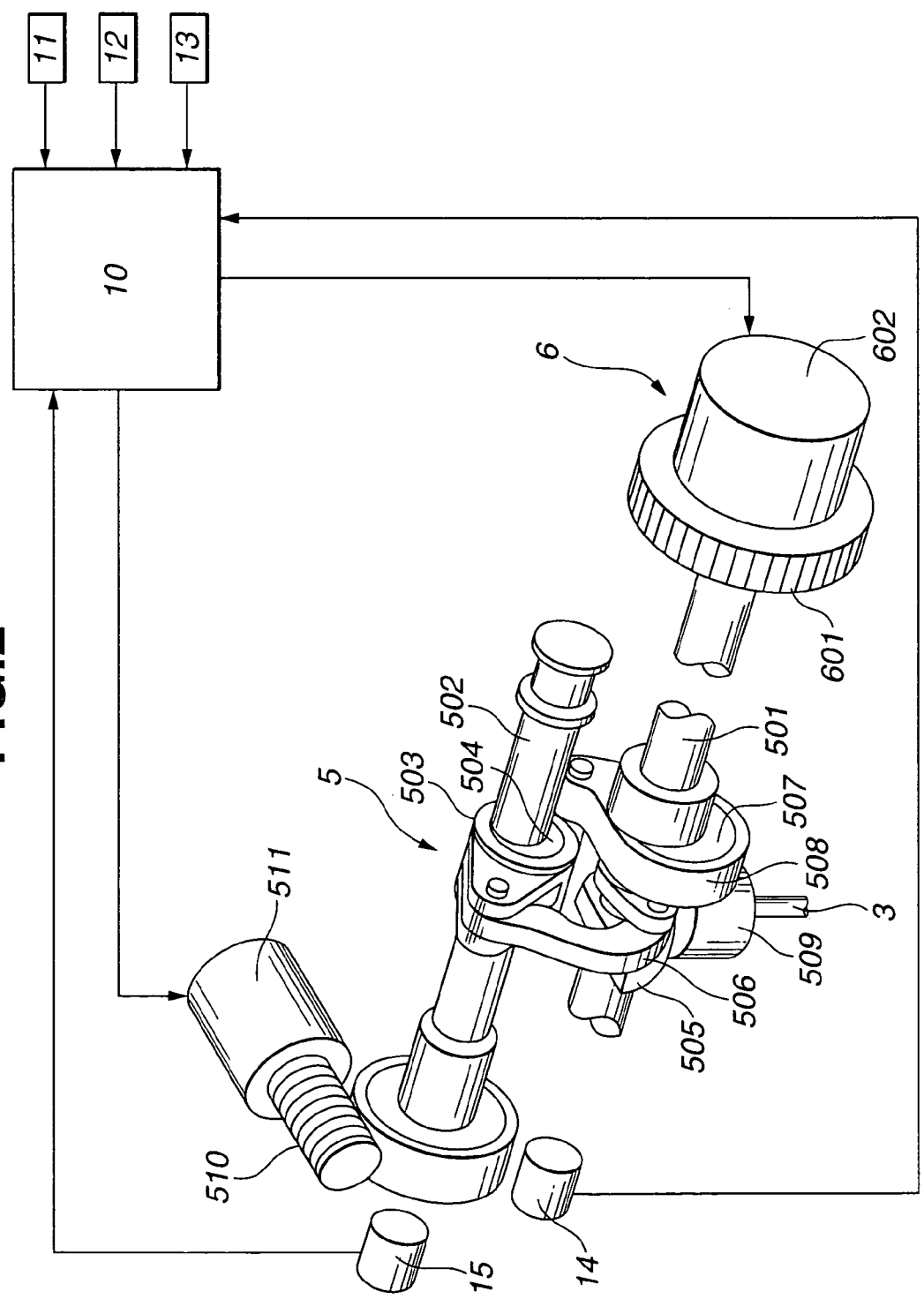
FIG. 2 is a schematic view of first and second valve control mechanisms of the intake valve control system of FIG. 1.

As shown in FIG. 2, first valve control mechanism 5 generally includes drive shaft 501 rotatably mounted on an engine cylinder head (not shown) and connected to an engine crankshaft (not shown), control shaft 502 rotatably mounted on the cylinder head in parallel with drive shaft 501, rocker arm 503 provided with control cam 504 and swingably attached to control shaft 502, oscillation cam 505 connected to rocker arm 503 through rod link 506, eccentric cam 507 fixedly attached to drive shaft 501 and connected to rocker arm 503 through pivotal link 508, valve lifter 509 actuated by oscillation cam 505 to move intake valve 3, gear 510 linked to control shaft 502, and actuator (e.g. electric motor) 511 that drives control shaft 502 through gear 510. When drive shaft 501 rotates with the crankshaft, pivotal link 508 is moved up and down by eccentric cam 507 to swing rocker arm 503. Upon the swinging movement of rocker arm 503, rod link 506 causes cam 505 to oscillate and thereby move valve lifter 509 up and down in such a manner as to open and close intake valve 3, i.e., vary the valve lift of intake valve 3. Further, the rotational position of control shaft 502 is controlled by actuator 511 through gear 510 to shift the pivotal axis of control cam 504 and the pivotal axis of rocker arm 503. The position of oscillation of cam 505 is then displaced to vary the operation angle of intake valve 3.

Second valve control mechanism 6 is arranged at one end of drive shaft 501, and generally includes timing sprocket 601 drivingly connected to the crankshaft through a timing chain or belt (not shown) and coaxially arranged on drive shaft 501, and actuator (e.g. hydraulic circuit) 602 that rotates timing sprocket 601 relative to drive shaft 501, as shown in FIG. 2. When timing sprocket 601 is rotated by actuator 602, the rotational position of drive shaft 501 relative to the crankshaft is changed to vary the maximum lift phase of intake valve 3.

The mechanical structures of first and second valve control mechanisms 5 and 6 are not limited to the above, and the first and second valve control mechanisms 5 and 6 may alternatively be designed in any other mechanical structures.

First and second valve control mechanisms 5 and 6 are operated independently of each other to vary the valve lift characteristics (operation angle and maximum lift phase) of intake valve 3 so as to adjust an intake air amount of engine 1. In order for engine 1 to insure stable combustion and optimal fuel economy, the intake air amount is adjusted by varying the operation angle of intake valve 3 while holding the maximum lift phase of intake valve 3 at a substantially constant position in a low-intake range (called "VEL range") where the intake air amount is relatively small, and by varying the maximum lift phase of intake valve 3 while holding the operation angle of intake valve 3 at a substantially constant angle in a high-intake range (called "VTC range") where the intake air amount is relatively large.

Throttle 2 is disposed in intake pipe 7 so that the opening of throttle 2 is controlled through an actuator/motor (not shown) not to adjust the intake air amount but to produce a slight negative pressure (e.g. −50 mmHg) for the treatment of blowby gas. Fuel injection valve 8 is disposed in intake pipe 7 to inject fuel into engine 1 by an amount appropriate to the intake air amount. It can be thus said that the power output of engine 1 is controlled by adjusting the intake air amount by means of first and second valve control mechanisms and 6.

The operations of first and second valve control mechanisms 5 and 6, throttle 2, fuel injection valve 8 and spark plug 9 are controlled by control unit 10. Control unit 10 is connected with accelerator pedal sensor 11 provided to a user-operated accelerator pedal (not shown) to detect an accelerator opening APO, engine speed sensor 12 to detect an engine speed Ne, intake air amount sensor 13 to detect an intake air amount, position sensor 14 to detect a rotational position of drive shaft 501 relative to timing sprocket 601 and position sensor 15 to detect a rotational position of control shaft 502. For feedback control, control unit 10 receives detection signals from these sensors 11 to 15, determines an fuel injection amount, ignition timing, a target operation angle and a target maximum lift phase based on the detection signals, and generates and outputs control signals to control fuel injection valve 8, spark plug 9, actuators 511 and 602 in accordance with the determined fuel injection amount, ignition timing, target operation angle and target maximum lift phase.

Next, the necessity for correcting the target operation angle to prevent engine 1 from becoming low in torque response according to the first embodiment will be explained.

Figure 3:
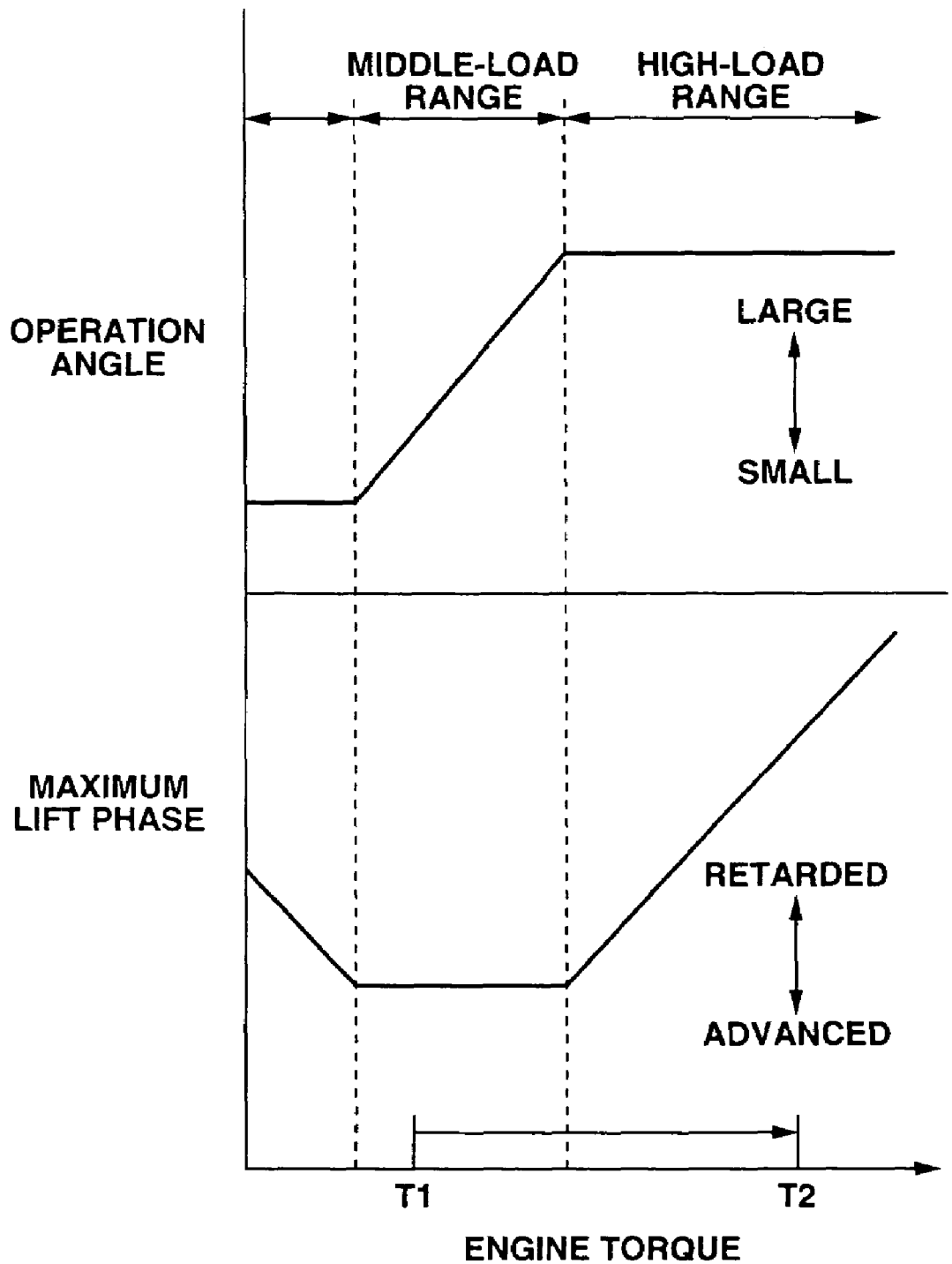
FIG. 3 is one example of the settings of an intake valve target operation angle and an intake valve target maximum lift phase relative to an engine load at a constant engine speed.

One example of the settings of the target operation angle and target maximum lift phase of intake valve 3 with respect to an engine load is shown in FIG. 3, on the condition that engine 1 is in a steady operating state at a constant engine speed Ne. (Hereinafter, such steady-state target operation angle and maximum lift phase are referred to as static target operation angle and maximum lift phase, respectively.) In a middle-load range corresponding to the low-intake range, the static target operation angle is varied with respect to the engine load whereas the static target maximum lift phase is held substantially constant. In a high-load range corresponding to the high-intake range, the static target maximum lift phase is varied with respect to the engine load whereas the static target operation angle is held substantially constant.

It is now assumed that engine 1 comes into a transient operating state where the engine load suddenly changes from a torque T1 (in the middle-load range) to a torque T2 (in the high-load range). As the accelerator opening APO increases, the static target operation angle becomes larger in the middle-load range, and then, the static target maximum lift phase becomes shifted to a retarded side in the high-load range. First and second valve control mechanisms 5 and 6 are however delayed in operation so that the actual operation angle and maximum lift phase of intake valve 3 lag behind and deviate from the static target operation angle and maximum lift phase, respectively, as shown in FIG. 4.

Figure 4:
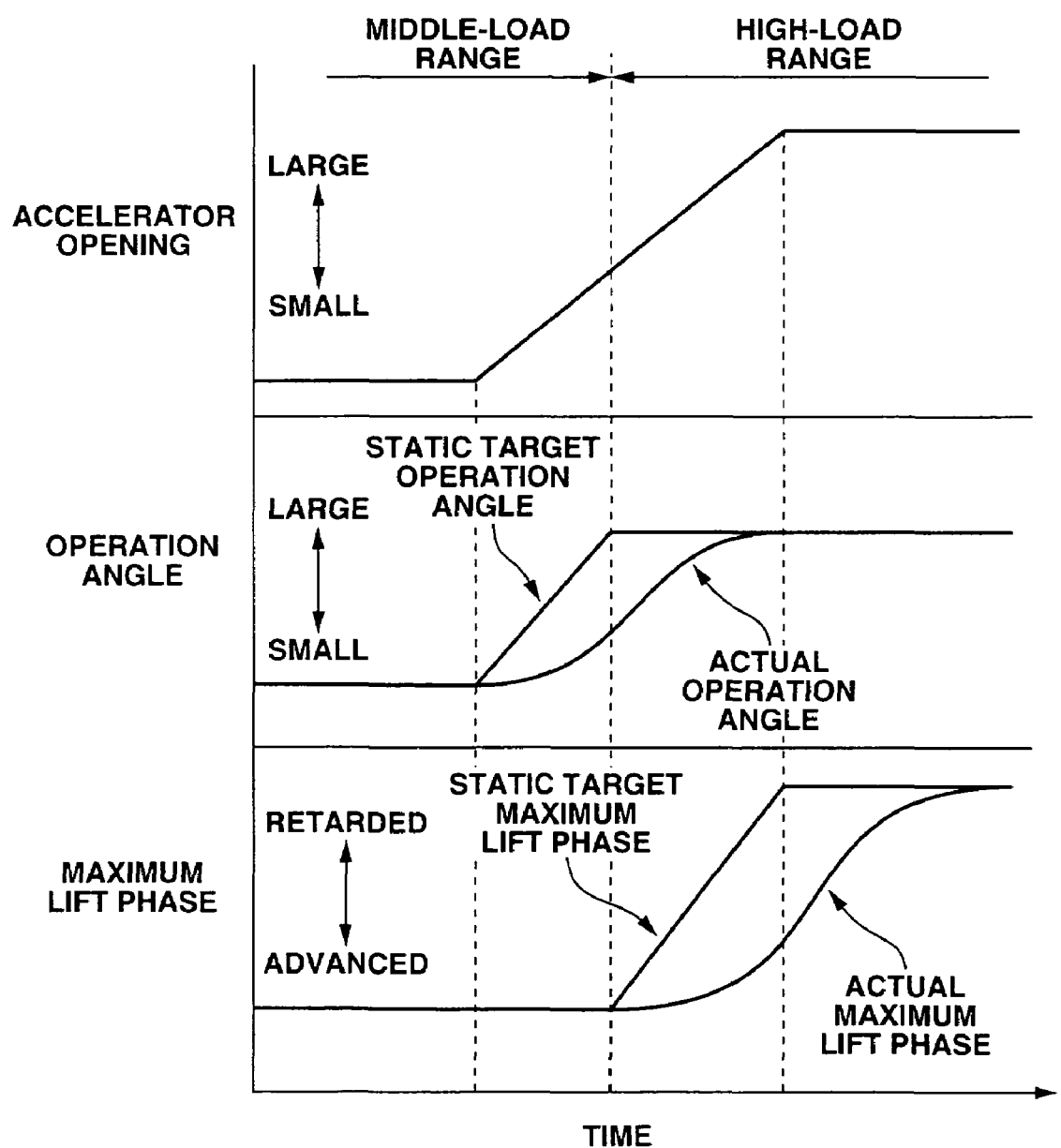
FIG. 4 is a diagram showing secular changes in accelerator opening, intake valve operation angle and intake valve maximum lift phase in a transient state where the engine load changes from a torque T1 to a torque T2 of FIG. 3.
Figure 5:
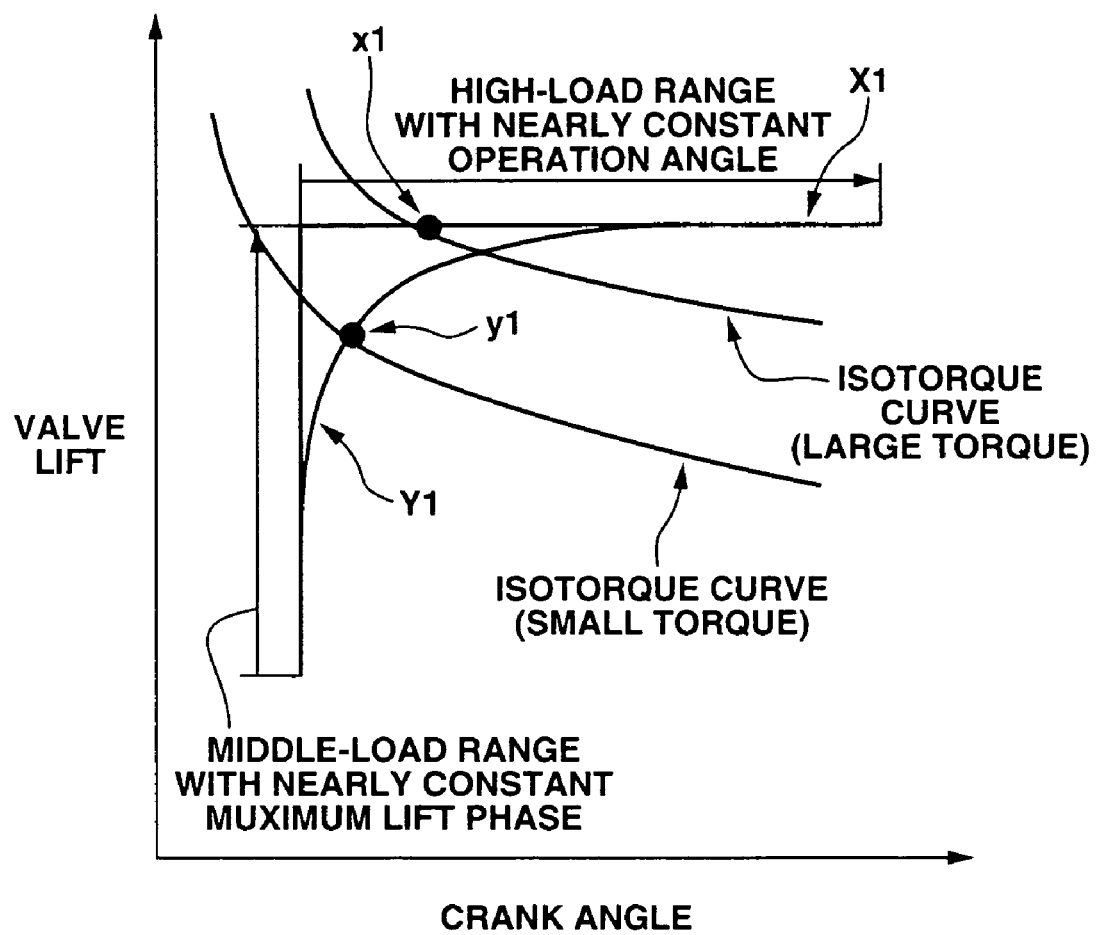
FIG. 5 is a diagram showing a change in maximum valve lift in the transient state of FIG. 4.

It should be noted that, for convenience of explanation, FIGS. 3 and 4 are illustrated as if to vary only the target operation angle in the middle-load and to vary only the target maximum lift phase in the high-load range. In practice, both of the target operation angle and maximum lift phase are varied simultaneously in many cases. However, variations in the target maximum lift phase are smaller than variations in the target operation angle in the middle-load range so that the adjustment of the intake air amount predominantly depends on the variations in the target operation angle. In the high-load range, variations in the target operation angle are smaller than variations in the target maximum lift phase so that the adjustment of the intake air amount predominantly depends on the variations in the target maximum lift phase. In FIGS. 3 and 4, such characteristic features are simplified only for ease of understanding. The same goes for FIGS. 5, 8, 11, 14 and 15 (described later).

The valve lift of intake valve 3 in the maximum lift phase (hereinafter referred to as a "maximum lift point") increases with the engine load in the middle-load range and stays substantially the same in the high-load range, because the maximum lift point of intake valve 3 increases with the operation angle of intake valve 3. On the other hand, the crank angular position that correlates with the maximum lift phase stays substantially the same in the middle-load range and shifts to the retarded side in the high-load range. In these respects, the ideal static valve lift characteristics of intake valve 3 are indicated by a line X1 of FIG. 5. However, the actual valve lift characteristics follow a line Y1 of FIG. 5 due to the operational delays of first and second valve control mechanisms 5 and 6. The maximum lift point of intake valve 3 therefore stands at a position y1 at one stage of valve control although it should have stood at a position x1. There are varying combinations of target operation angles and target maximum lift phases for achieving the same engine torque, which are represented by a so-called isotorque curve. An isotorque curve passing through y1 corresponds to a lower torque as compared to an isotorque curve passing through x1. In other words, the torque response of engine 1 becomes low in the above transient operating state.

In order to prevent such deterioration in engine torque response, the static target operation angle is corrected in a transient operating state where there arises a relatively large deviation between the actual and target maximum lift phases of intake valve 3 due to the operational delay of second valve control mechanism 6.

In the first embodiment, control unit 10 is configured to judge based on the accelerator opening APO and accelerator opening change rate DAPO whether engine 1 is in the transient operating state in the high-load range (i.e., high-intake VTC range) and, if yes, correct the static target operation angle based the accelerator opening change rate DAPO to give a dynamic target operation angle for such a high-load transient operating state.

Figure 6A:
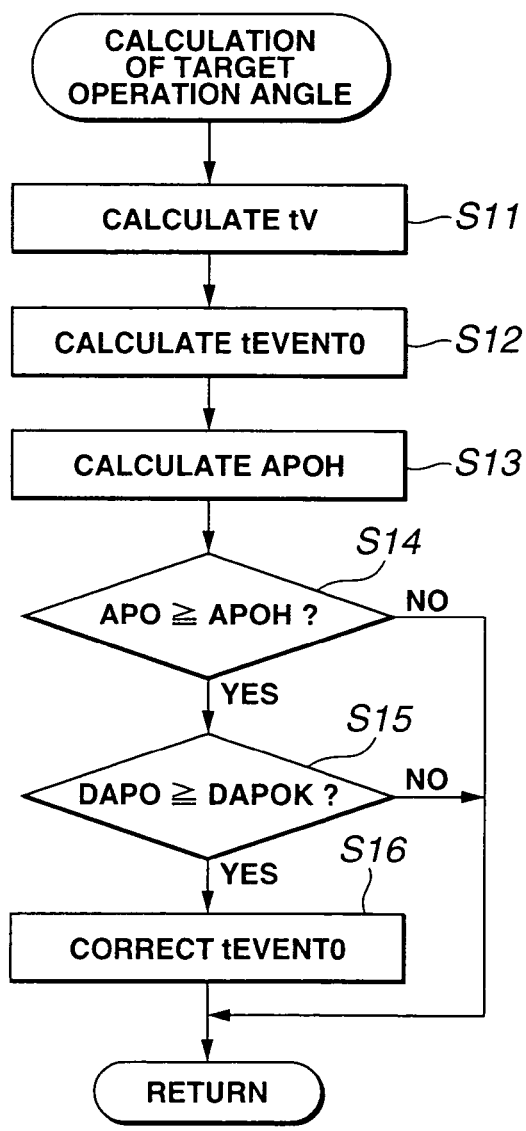
FIG. 6A is a flowchart for the calculation of a target intake valve operation angle according to a first embodiment of the present invention.

The calculation of the target operation angle is carried out as shown in FIG. 6A. In step S11, control unit 10 calculates a target intake air amount tV from the current accelerator opening APO. In step S12, control unit 10 calculates a static target operation angle tEVENT0 based on the target intake air amount tV. In step S13, control unit 10 calculates a reference accelerator opening APOH from the current engine speed Ne for judgment of the compliance with the high-load range. In step S14, control unit 10 makes a comparison between the current accelerator opening APO and the reference accelerator opening APOH to determine whether the accelerator opening APO is larger than or equal to the reference accelerator opening APOH. If APO≧APOH (YES in step S14), control unit 10 makes a comparison between the current accelerator opening change rate DAPO and a threshold value DAPOK to determine whether the accelerator opening change rate DAPO is larger than or equal to the threshold value DAPOK in step S15. The threshold value DAPOK is generally set to increase and decrease with the response (control speed) of second valve control mechanism 6. It is for the reason that, when second valve control mechanism 6 is too low in response to follow a change in the accelerator opening APO, the actual maximum lift phase of intake valve 3 is likely to deviate from the target maximum lift phase. If DAPO≧DAPOK (YES in step S15), control unit 10 judges that engine 1 is in the transient operating state and corrects the static target operation angle tEVENT0 to give a dynamic target operation angle as a final target operation angle tEVENT in step S16. The target operation angle is corrected to become increased when the actual maximum lift phase rCENTER deviates relatively largely from the target maximum lift phase tCENTER toward an advanced side. If APO<APOH (NO in step S14) or DAPO<DAPOK (NO in step S15), control unit 10 defines the static target operation angle tEVENT0 as a final target operation angle tEVENT. Although the accelerator pedal APO and the accelerator pedal change rate DAPO are used for judgment as to the transient operating state of engine 1 in the high-load range in the first embodiment, it is alternately possible to use as such judgment parameters the target intake air amount tV and its change rate.

Figure 6B:
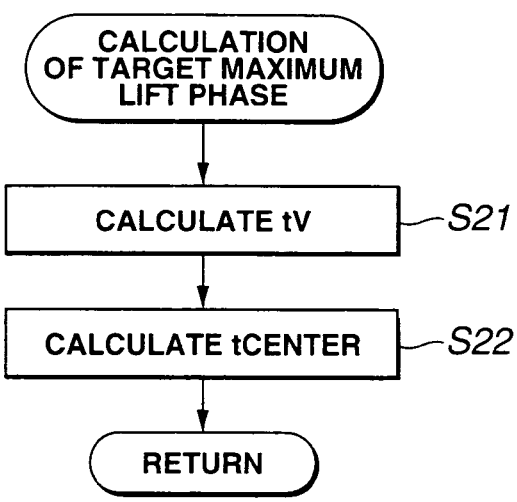
FIG. 6B is a flowchart for the calculation of a target intake valve maximum lift phase according to the first embodiment of the present invention.

The calculation of the target maximum lift phase is carried out as shown in FIG. 6B. In step S21, control unit 10 calculates a target intake air amount tV from the current accelerator opening APO. In step S22, control unit 10 calculates a static target maximum lift phase tCENTER based on the target intake air amount tV.

Control unit 10 thus operates first and second valve control mechanisms 5 and 6 so as to control the actual operation angle rEVENT and the actual maximum lift phase rCENTER of intake valve 3 to the final target operation angle tEVENT and the static target maximum lift phase tCENTER, respectively.

Figure 7:
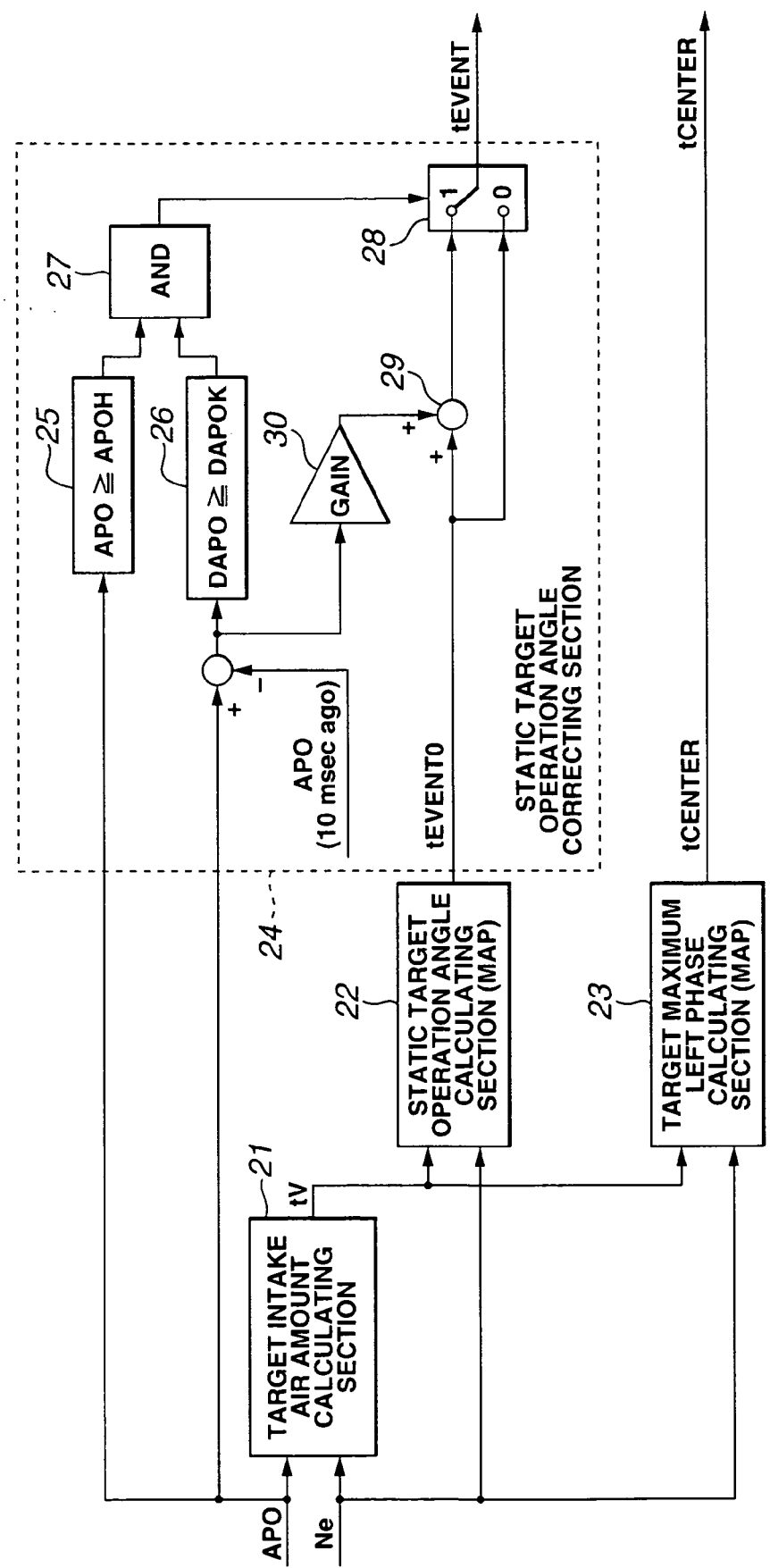
FIG. 7 is a functional diagram of the intake valve control system according to the first embodiment of the present invention.

The functions of control unit 10 are indicated in FIG. 7. The target intake air amount tV is set based on the current accelerator opening APO and the current engine speed Ne by means of target intake air amount calculating section 21. The static target operation angle tEVENT0 and the static target maximum lift phase tCENTER, which attain stable combustion and optical fuel economy in a steady engine operating state, are set by means of static target operation angle calculating section 22 and target maximum lift phase calculating section 23, respectively, based on the target intake air amount tV. Each of static target operation angle calculating section 22 and target maximum lift phase calculating section 23 stores therein a map or table (not shown) and retrieves the corresponding target value from the map or table in reference to the current target intake air amount tV and the current engine speed Ne in the first embodiment. The static target operation angle tEVENT0 is corrected by means of static target operation angle correcting section 24 when engine 1 is judged as being in the transient operating state in the high-load range. For judgment on the transient operating state of engine 1 in the high-load range, the satisfaction of the conditions of APO≧APOH and DAPO≧DAPOK are examined by means of blocks 25 and 26, respectively. When both the conditions of APO≧APOH and DAPO≧DAPOK are satisfied, the necessity for correcting the static target operation angle tEVENT0 is decided on by means of blocks 27 and 28. The static target operation angle tEVENT0 is corrected by multiplying the accelerator opening change rate DAPO by a predetermined gain factor at multiplier 30 to give a correction value, and then, adding the correction value to the static target operation angle tEVENT0 at adder 29.

Figure 8:
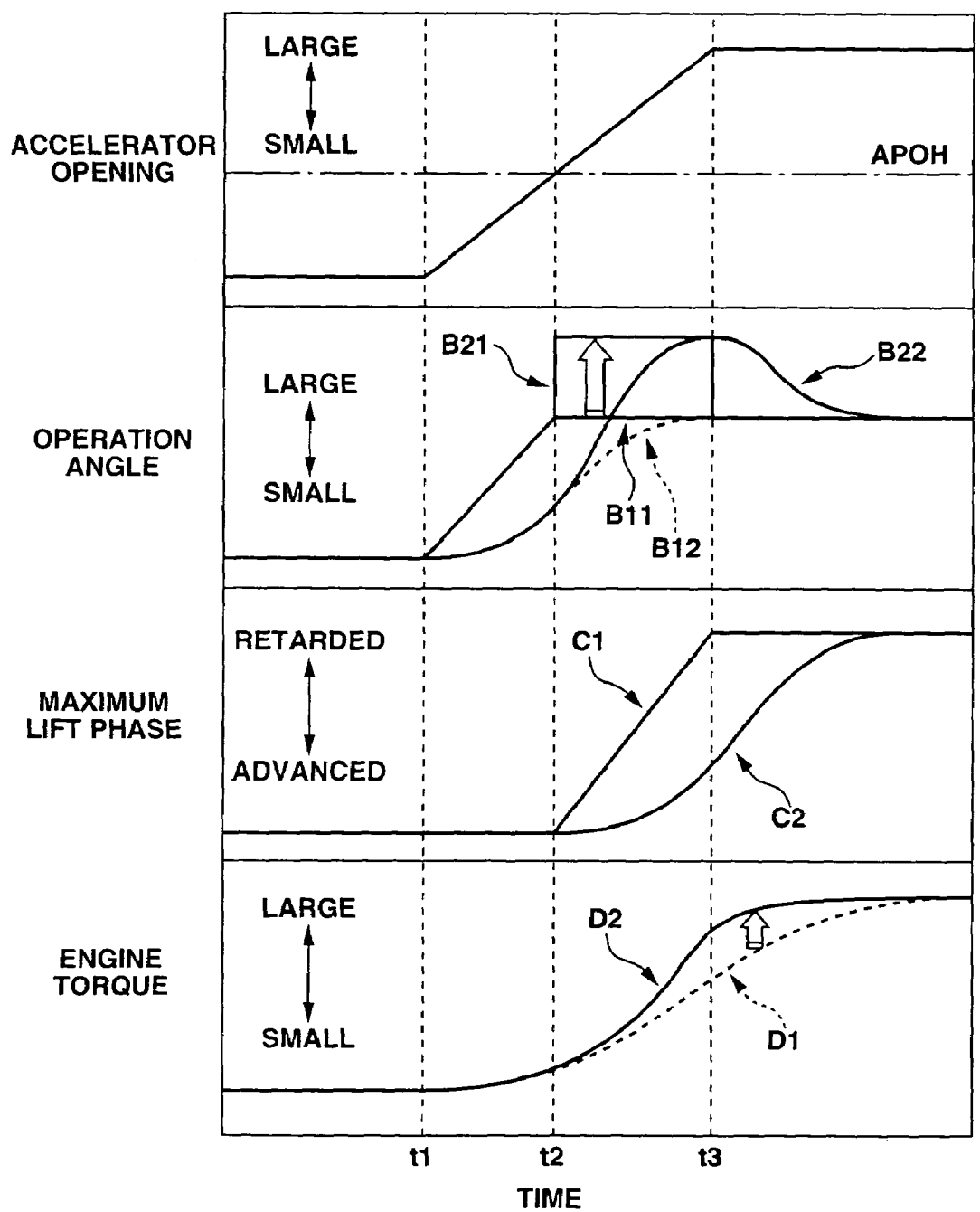
FIG. 8 is a timing chart of target operation angle correction process in a transient operating state according to the first embodiment of the present invention.
Figure 9:
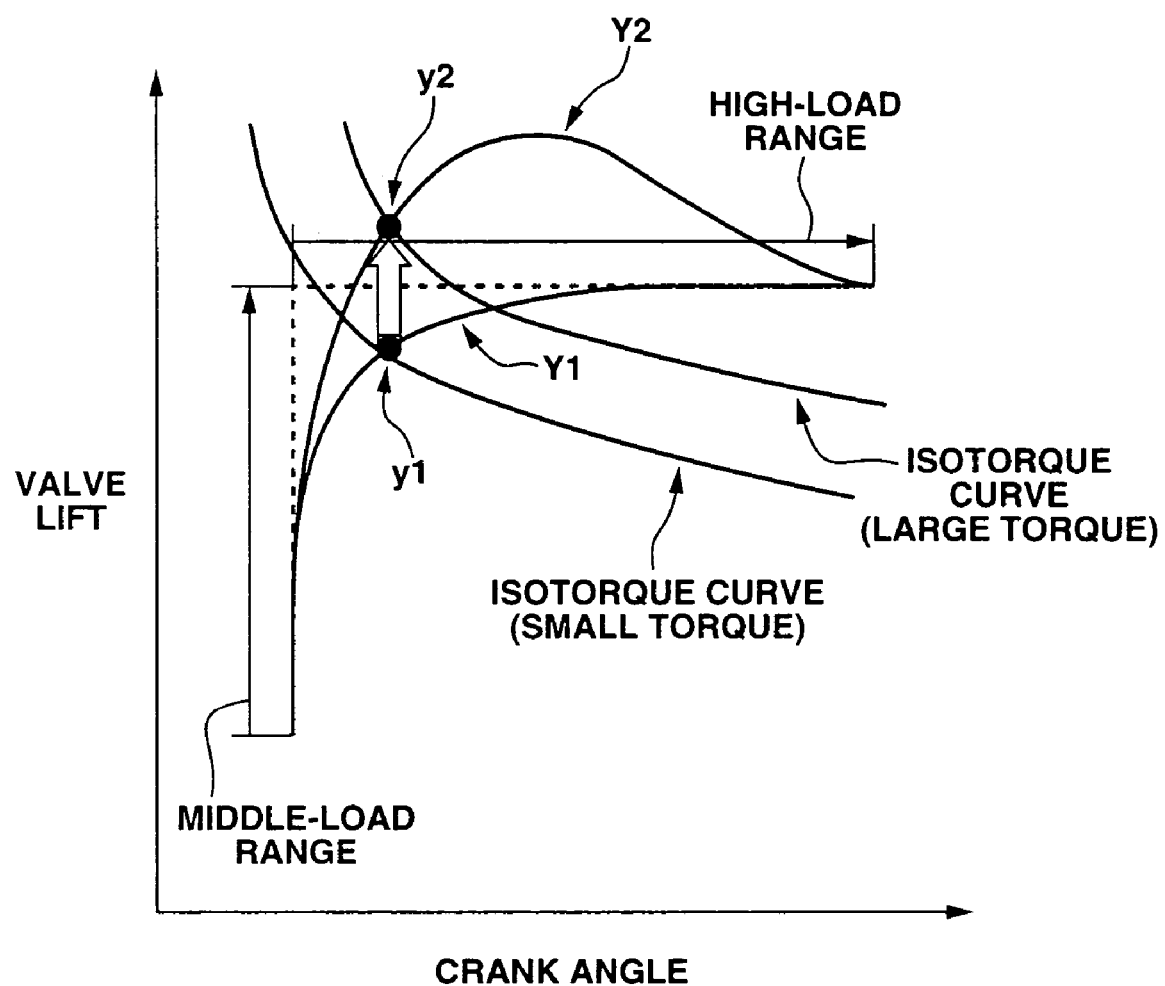
FIG. 9 is a diagram showing a change in maximum valve lift during the target operation angle correction process according to the first embodiment of the present invention.

The above target operation angle correction process is effected as shown in FIG. 8, in a case where engine 1 comes into the transient operating state during the shifting from the middle-load range to the high-load range upon accelerator pedal depression. The engine speed Ne is now assumed to remain the same. While the accelerator pedal is depressed during a time period from instant t1 to instant t3, the target intake air amount tV is calculated from the accelerator opening APO. Then, the static target operation angle tEVENT0 and the static target maximum lift phase tCENTER are given based on the target intake air amount tV as indicated by a line B11 and a line C1 of FIG. 8, respectively.

If the static target operation angle tEVENT0 is kept adopted as the final target operation angle tEVENT, the actual operation angle rEVENT and the actual maximum lift rCENTER of intake valve 3 lag behind the target operation angle tEVENT (=tEVENT0) and the target maximum lift phase tCENTER due to the operational delays of first and second valve control mechanisms 5 and 6 and change along a line B12 and a line C2 of FIG. 8, respectively. As a result, the engine torque changes along a line D1 of FIG. 8.

Figure 10:
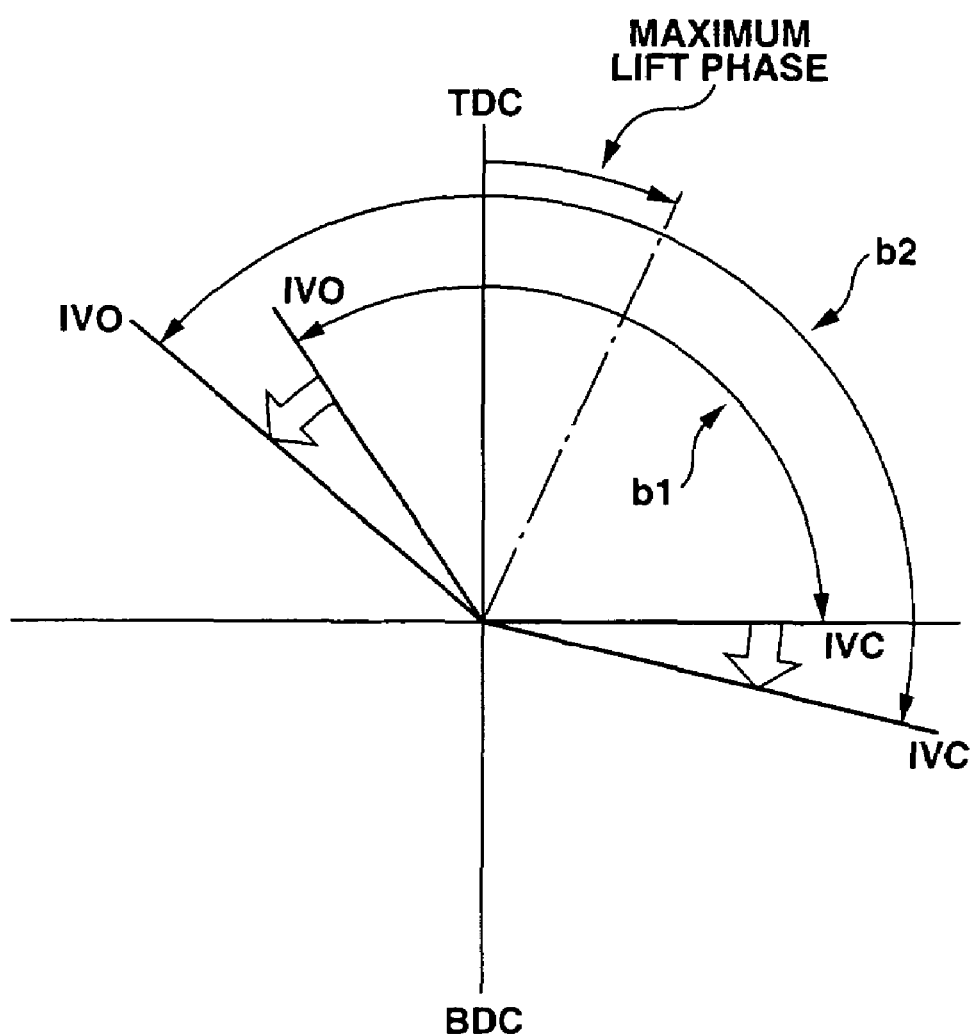
FIG. 10 is a graph showing a change in intake valve operation angle upon the target operation angle correction process according to the first embodiment of the present invention.

In the first embodiment, however, the target operation angle correction process is performed during a time period from instant t2 to instant t3 in which both the conditions of APO≧APOH and DAPO≧DAPOK are satisfied. The correction value responsive to the accelerator opening change rate DAPO is added to the static target operation angle tEVENT0 to give the dynamic target operation angle as the final target operation angle tEVENT. The target operation angle tEVENT thus becomes increased to a line B21 of FIG. 8. The actual operation angle rEVENT follows the increased target operation angle tEVENT and changes along a line B22 of FIG. 8, thereby obtaining a higher engine torque as indicated by a line D2 of FIG. 8. Accordingly, the valve lift characteristics of intake valve 3 change from Y1 to Y2 of FIG. 9 to thereby increase the maximum lift point of intake valve 3 from y1 to y2 of FIG. 9 along a torque increasing direction at one stage of valve control. It is because the intake air amount becomes larger even in the same maximum lift phase when the operation angle of intake valve 3 is increased from b1 to b2 as shown in FIG. 10. (The terms "IVO", "IVC", "TDC" and "BDC" of FIG. 10 refer to an opening timing of intake valve 3, a closing timing of intake valve 3, top dead center and bottom dead center, respectively. As the intake valve operation angle is increased, the valve closing timing becomes nearer to BDC.) This leads to improvement in the torque response of engine 1 in the transient operating state.

Figure 11:
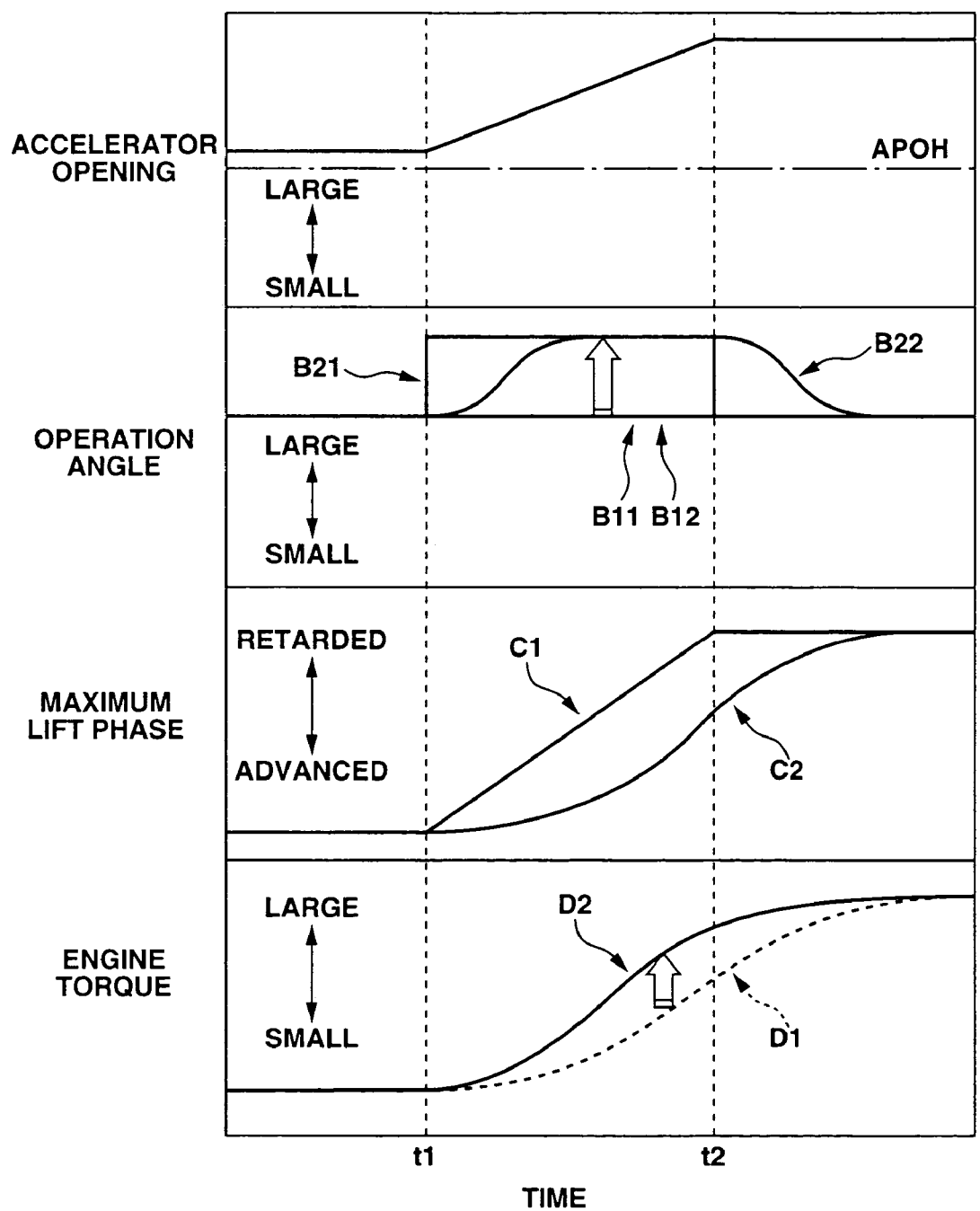
FIG. 11 is a timing chart of the target operation angle correction process in another transient operating state according to the first embodiment of the present invention.

In a case where engine 1 comes into the transient operating state within the high-load range upon accelerator pedal depression, the target operation angle correction process is effected as shown in FIG. 11. The engine speed Ne is assumed to remain the same. In this case, the accelerator pedal is further depressed during a time period from instant t1 to instant t2 although the accelerator opening APO has already exceeded the reference accelerator opening APOH. The target intake air amount tV is calculated from the accelerator opening APO. Then, the static target operation angle tEVENT0 and the static target maximum lift phase tCENTER are given based on the target intake air amount tV as indicated by a line B11 and a line C1 of FIG. 11, respectively. The static target operation angle tEVENT0 is held substantially constant in the high-load range as mentioned above.

If the static target operation angle tEVENT0 is adopted as the final target operation angle tEVENT, the actual operation angle rEVENT follows the substantially constant target operation angle tEVENT (=tEVENT0) as indicated by a line B12 of FIG. 11. On the other hand, the actual maximum lift phase rCENTER lags behind the target maximum lift phase tCENTER due to the operational delay of second valve control mechanism 6 and changes along a line C2 of FIG. 11. As a result, the engine torque changes along a line D1 of FIG. 11.

The target operation angle correction process is thus performed during the time period from instant t1 to instant t2 in which both the conditions of APO≧APOH and DAPO≧DAPOK are satisfied. The correction value responsive to the accelerator opening change rate DAPO is added to the static target operation angle tEVENT0 to give the dynamic target operation angle as the final target operation angle tEVENT. The target operation angle tEVENT thus becomes increased to a line B21 of FIG. 11. The actual operation angle rEVENT follows the increased target operation angle tEVENT and changes along a line B22 of FIG. 11, thereby obtaining a higher engine torque as indicated by a line D2 of FIG. 11. This also leads improvement in the torque response of engine 1 in the transient operating state.

As described above, the static target operation angle is corrected so as to compensate for the operational delay of second valve control mechanism 6 when engine 1 comes into the transient operating state where the actual maximum lift phase of intake valve 3 deviate from the target maximum lift phase. It is therefore possible to control the intake air amount with very little delay and to improve the torque response of engine 1 in such a transient operating state.

The second embodiment will be next described below with reference to FIGS. 12A, 12B, 13 and 14. The second embodiment is similar to the first embodiment, except that control unit 10 is configured to judge whether engine 1 is in the transient operating state in the high-load range based on a deviation between the actual maximum lift phase and the target maximum lift phase and, if yes, corrects the static target operation angle based on the phase deviation to give a dynamic target operation angle.

Figure 12A:
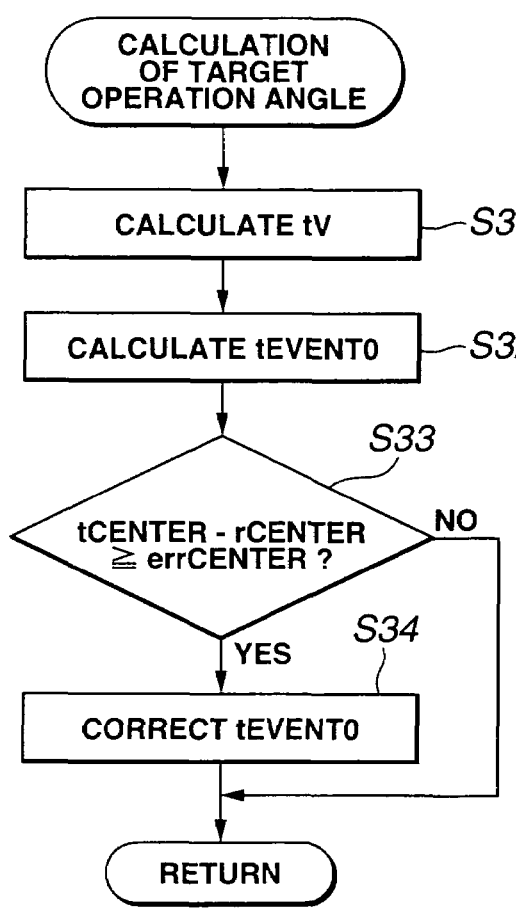
FIG. 12A is a flowchart for the calculation of a target intake valve operation angle according to a second embodiment of the present invention.

The calculation of the target operation angle is carried out as indicated in FIG. 12A in the second embodiment. In step S31, control unit 10 calculates a target intake air amount tV from the current accelerator opening APO. In step S32, control unit 10 calculates a static target operation angle tEVENT0 based on the target intake air amount tV. In step S33, control unit 10 calculates a phase deviation between the current actual maximum lift phase rCENTER and the current target maximum lift phase tCENTER and compares the phase deviation with a threshold value errCENTER to determine whether the phase deviation is larger than or equal to the threshold value errCENTER. The threshold value errCENTER is set at a relatively small value near zero in the second embodiment. If (tCENTER−rCENTER)≧errCENTER (YES in step S33), control unit 10 judges that engine 1 is in the transient operating state in the high-load range and corrects the static target operation angle tEVENT0 to give a dynamic target operation angle as the final target operation angle tEVENT in step S34. As in the first embodiment, the target operation angle is corrected to become increased when the actual maximum lift phase deviates relatively largely from the target maximum lift phase toward the advanced side. If (tCENTER−rCENTER)<errCENTER (NO in step S33), control unit 10 determines the static target operation angle tEVENT0 as a final target operation angle tEVENT.

Figure 12B:
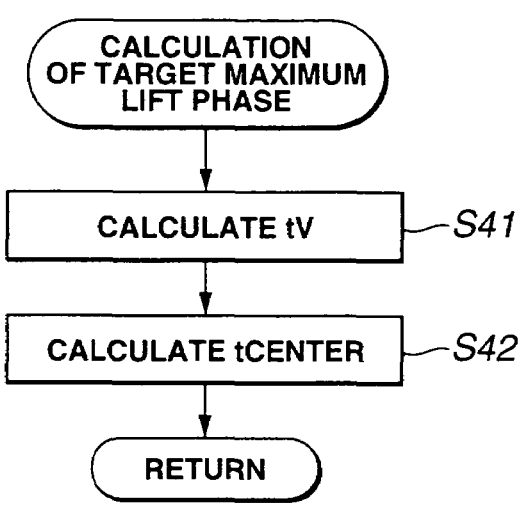
FIG. 12B is a flowchart for the calculation of a target intake valve maximum lift phase according to the second embodiment of the present invention.

The calculation of the maximum lift phase is carried out as shown in FIG. 12B. In step S41, control unit 10 calculates a target intake air amount tV based on the current accelerator opening APO. In step S42, control unit 10 calculates a static target maximum lift phase tCENTER based on the target intake air amount tV.

Figure 13:
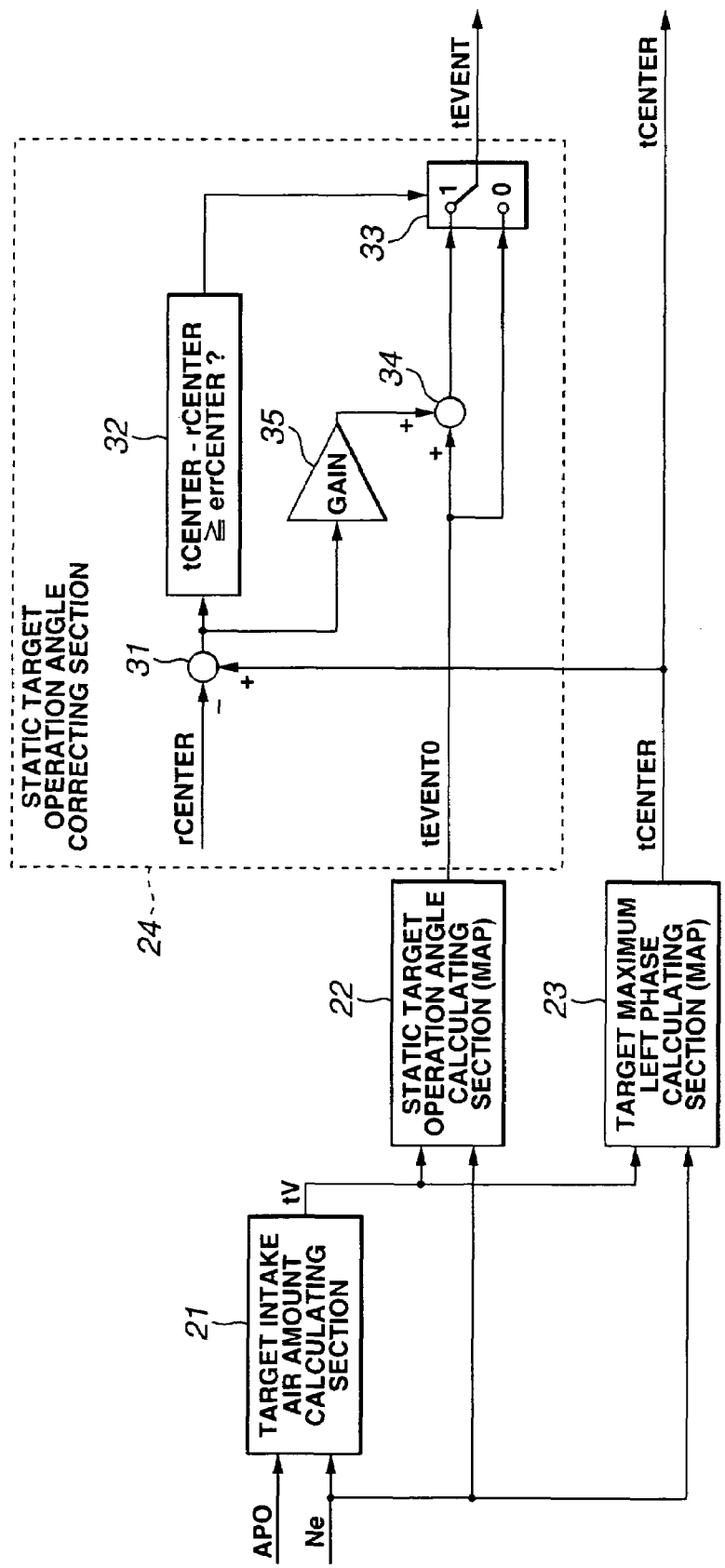
FIG. 13 is a functional diagram of an intake valve control system according to the second embodiment of the present invention.

The functions of control unit 10 of the second embodiment are indicated in FIG. 13. The target intake air amount tV, the static target operation angle tEVENT0 and the static target maximum lift phase tCENTER are calculated by means of target intake air amount calculating section 21, static target operation angle calculating section 22 and target maximum lift phase calculating section 23, respectively, in the same manner as in the first embodiment. The static target operation angle tEVENT0 is corrected by means of static target operation angle correcting section 24 when engine 1 is judged as being in the transient operating state in the high-load range. For judgment on the transient operating state of engine 1 in the high-load range, the phase deviation (tCENTER−rCENTER) is given at subtracter 31, and the satisfaction of the condition of (tCENTER−rCENTER)≧errCENTER is examined by means of block 32. When the condition of (tCENTER−rCENTER)≧errCENTER is satisfied, the necessity for correcting the static target operation angle tEVENT0 is decided on by means of block 33. The static target operation angle tEVENT0 is corrected by multiplying the phase deviation (tCENTER−rCENTER) by a predetermined gain factor at multiplier 35 to give a correction value, and then, adding the correction value to the static target operation angle tEVENT0 at adder 34.

Figure 14:
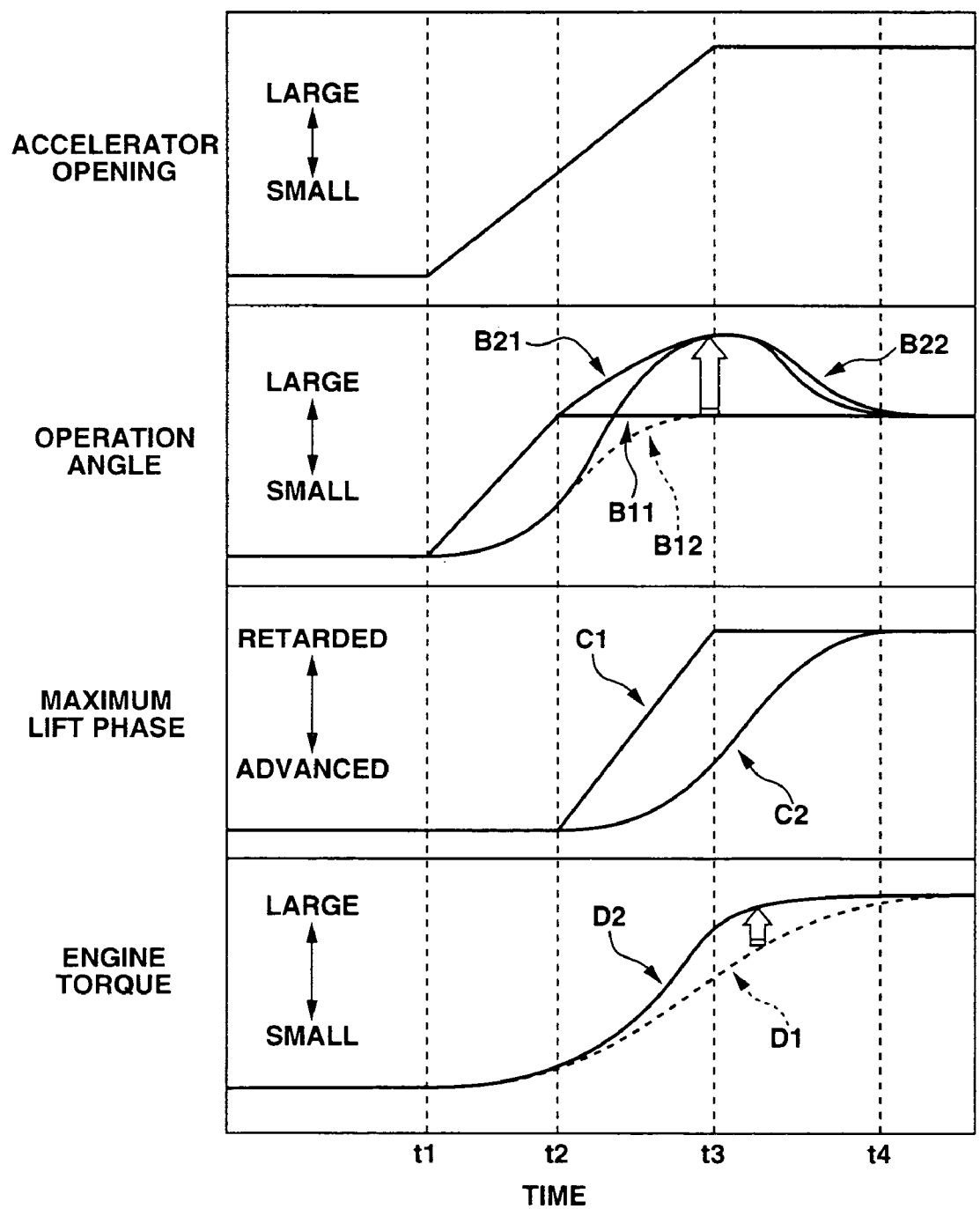
FIG. 14 is a timing chart of target operation angle correction process in a transient operating state according to the second embodiment of the present invention.

The above target operation angle correction process is effected as shown in FIG. 14, in a case where engine 1 comes into the transient operating state during the shifting from the middle-load range to the high-load range upon accelerator pedal depression. The engine speed Ne is assumed to remain the same. While the accelerator pedal is depressed during a time period from instant t1 to instant t3, the target intake air amount tV is calculated from the accelerator opening APO. The static target operation angle tEVENT0 and the static target maximum lift phase tCENTER are given based on the target intake air amount tV as indicated by a line B11 and a line C1 of FIG. 14, respectively.

If the static target operation angle tEVENT0 is kept adopted as the final target operation angle tEVENT, the actual operation angle rEVENT and the actual maximum lift rCENTER phase lag behind the target operation angle tEVENT (=tEVENT0) and the target maximum lift phase tCENTER due to the operational delays of first and second valve control mechanisms 5 and 6 and change along a line B12 and a line C2 of FIG. 14, respectively. As a result, the engine torque changes along a line D1 of FIG. 14.

In the second embodiment, however, the target operation angle correction process is performed during a time period from instant t2 to instant t4 in which the condition of (tCENTER−rCENTER)≧errCENTER is satisfied. The correction value responsive to the phase deviation (tCENTER−rCENTER) is added to the static target operation angle tEVENT0 to give the dynamic target operation angle as the final target operation angle tEVENT. The target operation angle tEVENT thus becomes increased to a line B21 of FIG. 14. The actual operation angle rEVENT follows the increased target operation angle tEVENT and changes along a line B22 of FIG. 14, thereby obtaining a higher engine torque as indicated by a line D2 of FIG. 14. The valve lift characteristics of intake valve 3 are improved so as to increase the maximum lift point of intake valve 3 at one stage of valve control in the same manner as in the first embodiment. The torque response of engine 1 in the transient operating state thus becomes higher.

Figure 15:
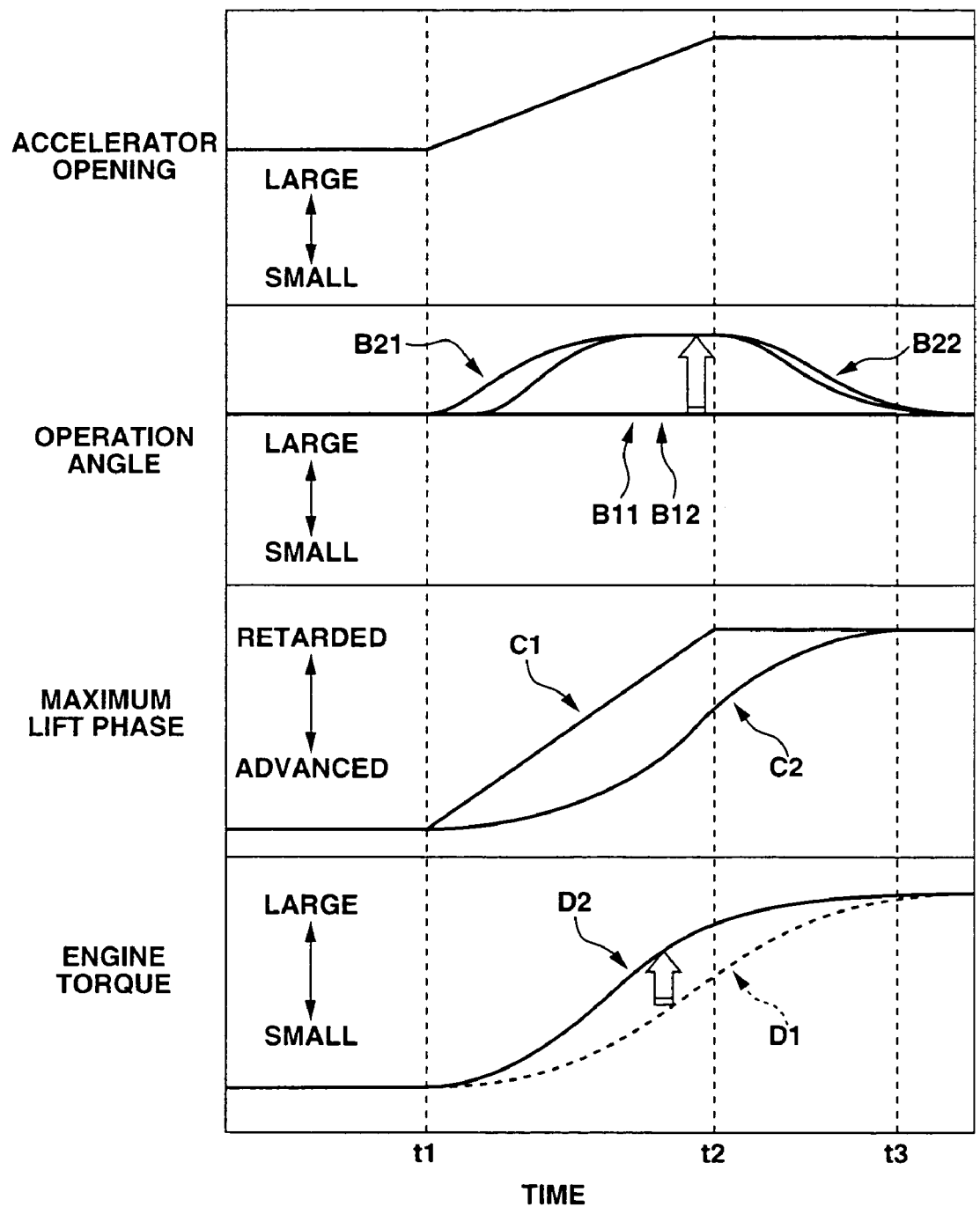
FIG. 15 is a timing chart of the target operation angle correction process in another transient operating state according to the second embodiment of the present invention.

In a case where engine 1 comes into the transient operating state within the high-load range upon accelerator pedal depression, the target operation angle correction process is effected as shown in FIG. 15. The engine speed Ne is assumed to remain the same. In this case, engine 1 is already in the high-load range, and the accelerator pedal is further depressed during a time period from instant t1 to t2. The target intake air amount tV is calculated from the accelerator opening APO. The static target operation angle tEVENT0 and the static target maximum lift phase tCENTER are given based on the target intake air amount tV as indicated by a line B11 and a line C1 of FIG. 15, respectively. The static target operation angle tEVENT0 is held substantially constant in the high-load range.

If the static target operation angle tEVENT0 is adopted as the final target operation angle tEVENT, the actual operation angle rEVENT follows the substantially constant target operation angle tEVENT (=tEVENT0) as indicated by a line B12 of FIG. 15. On the other hand, the actual maximum lift phase rCENTER lags behind the target maximum lift phase tCENTER due to the operational delay of second valve control mechanism 6 and changes along a line C2 of FIG. 15. As a result, the engine torque changes along a line D1 of FIG. 15.

The target operation angle correction process is thus performed during a time period from instant t1 to instant t3 in which the condition of (tCENTER−rCENTER)≧errCENTER is satisfied. Namely, the correction value responsive to the phase deviation (tCENTER−rCENTER) is added to the static target operation angle tEVENT0 to give the dynamic target operation angle as the final target operation angle tEVENT. The target operation angle thus becomes increased to a line B21 of FIG. 15. The actual operation angle rEVENT follows the increased target operation angle tEVENT and changes along a line B22 of FIG. 15, thereby obtaining a higher engine torque as indicated by a line D2 of FIG. 15. The torque response of engine 1 can be thus improved.

As in the first embodiment, the static target operation angle is corrected so as to compensate for the operational delay of second valve control mechanism 6 when engine 1 comes into the transient operating state where the actual maximum lift phase of intake valve 3 deviates from the target maximum lift phase in the second embodiment. It is therefore possible to control the intake air amount with very little delay and improve the torque response of engine 1 in such a transient operating state. By determining the correction value based on the phase deviation (tCENTER−rCENTER), it is additionally possible in the second embodiment to prevent the correction value from becoming excessively large to such an extent that the closing timing IVC of intake valve 3 is retarded to lower the torque of engine 1 due to spit-back. Also, the target operation angle correction process of the second embodiment can be easily applied to the system even when the response of second valve control mechanism 6 is modified.

The third embodiment will be explained below with reference to FIGS. 16 to 18. The third embodiment is similar to the second embodiment, except that control unit 10 is configured to set a maximum limit on the corrected target operation angle. When the corrected target operation angle becomes too large beyond a proper limit, the intake air amount does not increase sufficiently owing to spit-back in some settings of engine 1. In addition, the interference between intake valve 3 and piston may become so significant that the formation of e.g. a valve recess is needed. In order to avoid such problems, the maximum limit is set on the corrected target operation angle to prevent the corrected target operation angle from becoming excessively large.

Figure 16:
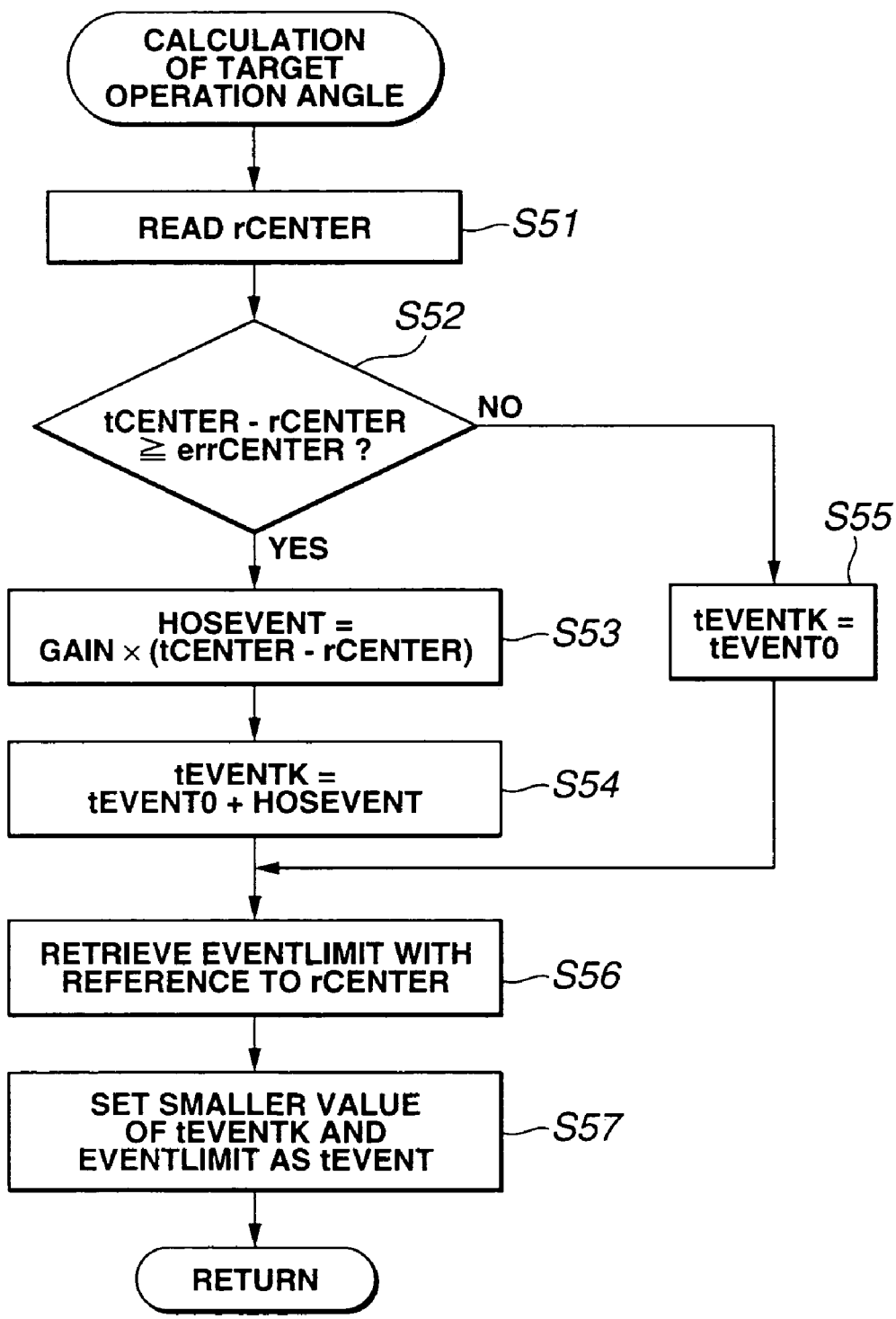
FIG. 16 is a flow chart for the calculation of a target intake valve operation angle according to a third embodiment of the present invention.

The calculation of the target operation angle is carried out as shown in FIG. 16 in the third embodiment. In step S51, control unit 10 reads the current actual maximum lift phase rCENTER. In step S52, control unit 10 compares a phase deviation between the current actual maximum lift phase rCENTER and the current target maximum lift phase tCENTER with a predetermined threshold value errCENTER to determine whether the phase deviation is larger than or equal to the threshold value errCENTER. If (tCENTER−rCENTER)≧errCENTER (YES in step S52), control unit 10 judges that engine 1 is in the transient operating state in the high-load range and determines a correction value HOSEVENT by multiplying the phase deviation (tCENTER−rCENTER) by a predetermined gain factor in step S53. In step S54, control unit 10 determines a corrected target operation angle tEVENTK (corresponding to the dynamic target operation angle in the first and second embodiments) by adding the correction value HOSEVENT to the static target operation angle tEVENT0 . If (tCENTER−rCENTER)<errCENTER (NO in step S52), control unit 10 determines the static target operation angle tEVENT0 as a corrected target operation angle (dynamic target operation angle) tEVENTK in step S55. In step S56, control unit 10 retrieves a maximum operation angle limit EVENTLIMIT from a given table or map in reference to the current actual maximum lift phase rCENTER. The maximum operation angle limit EVENTLIMIT corresponds to an operation angle of intake valve 3 at which the intake air amount is maximized in the current maximum lift phase. Although the maximum operation angle limit EVENTLIMIT is determined based on the actual maximum lift phase rCENTER in the third embodiment, it may be more desirable to determine the maximum operation angle limit EVENTLIMIT based on both of the actual maximum lift phase rCENTER and the engine speed Ne. In step S57, control unit 10 makes a comparison between the corrected target operation angle tEVENTK and the maximum operation angle limit EVENTLIMIT and selects the smaller value of the corrected target operation angle tEVENTK and the maximum operation angle limit EVENTLIMIT as a final target operation angle tEVENT.

Figure 17:
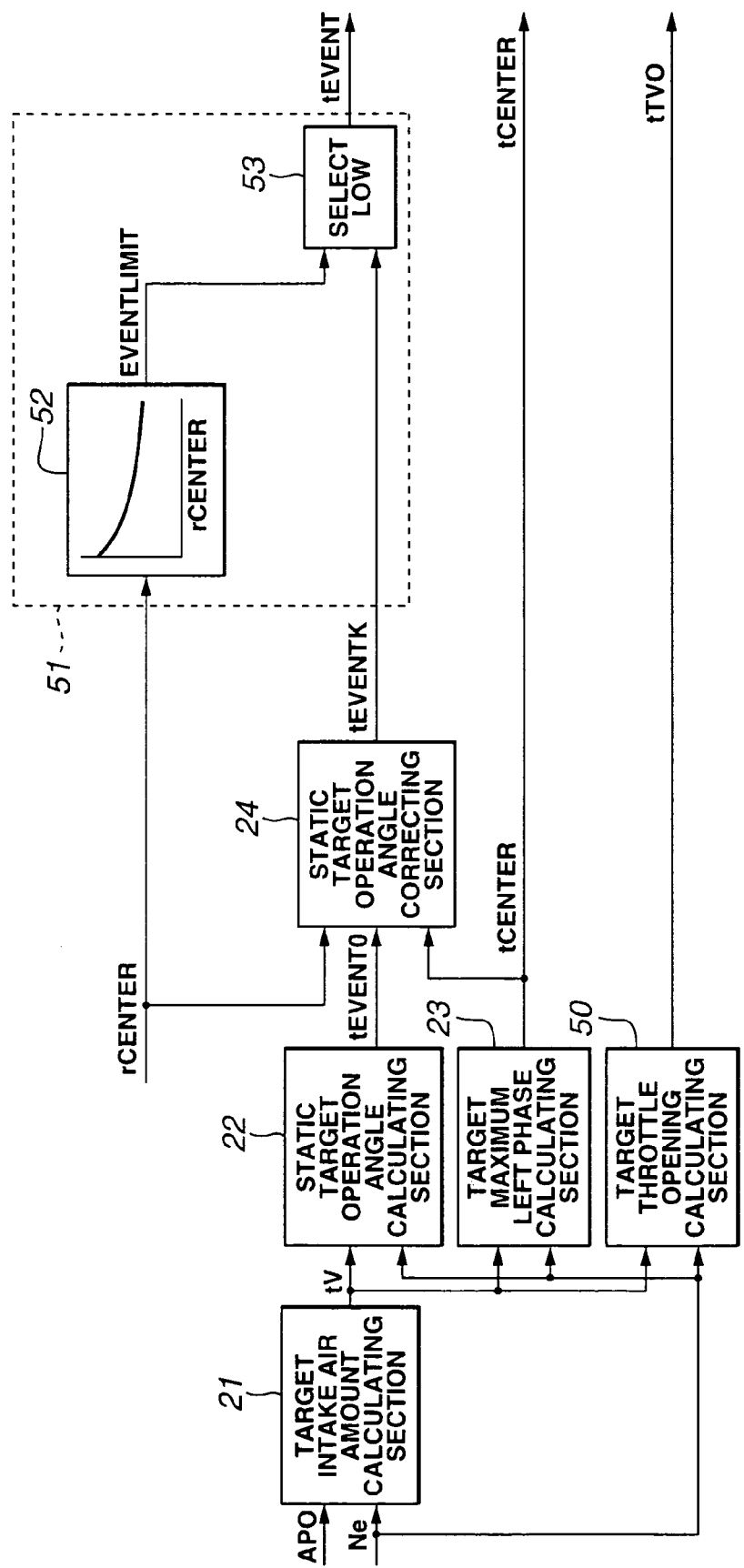
FIG. 17 is a functional diagram of an intake valve control system according to the third embodiment of the present invention.

The functions of control unit 10 of the third embodiment are indicated in FIG. 17. The target intake air amount tV, the static target operation angle tEVENT0 and the static target maximum lift phase tCENTER are calculated by means of target intake air amount calculating section 21, static target operation angle calculating section 22 and target maximum lift phase calculating section 23, respectively, in the same manner as in the second embodiment. The target throttle opening tTVO is calculated by means of target throttle opening calculating section 50 although it is omitted from the first and second embodiments. The corrected target operation angle tEVENTK is calculated from the static target operation angle tEVENT0 by means of target operation angle correcting section 24 when engine 1 is judged as being in the transient operating state in the high-load range, in the same manner as in the second embodiment. The maximum operation angle limit EVENTLIMIT is set on the corrected target operation angle tEVENTK by means of target operation angle limiting section 51 as follows. The maximum operation angle limit EVENTLIMIT is outputted by block 52. In the third embodiment, block 52 stores therein the table or map defining the operation angle at which the intake air amount becomes maximized with respect to the maximum lift phase, and retrieves the maximum operation angle limit EVENTLIMIT from the table or map in reference to the current actual maximum lift phase rCENTER. As mentioned above, it is alternatively possible to store the table or map defining the operation angle at which the intake air amount becomes maximized with respect to the maximum lift phase and the engine speed and retrieve the maximum operation angle limit EVENTLIMIT from the table in reference to the current actual maximum lift phase rCENTER and the current engine speed Ne. The corrected target operation angle tEVENTK is limited to the maximum operation angle limit EVENTLIMIT and below by means of block 53, thereby providing the final target operation angle tEVENT.

Figure 18:
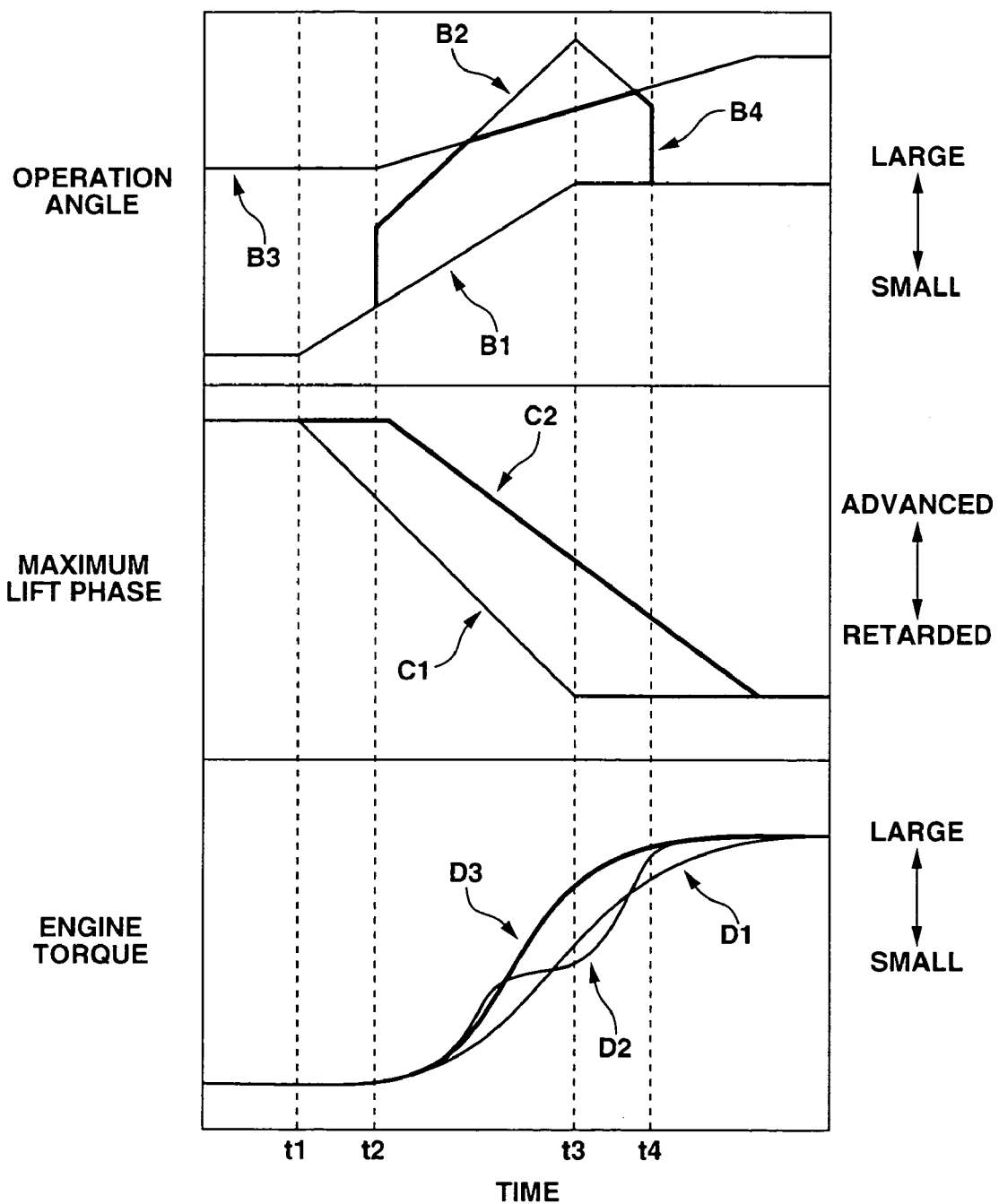
FIG. 18 is a timing chart of target intake valve operation angle correction process in a transient operating state according to the third embodiment of the present invention.

The above target operation angle correction process is effected as shown in FIG. 18 in the third embodiment, in a case where engine 1 comes into the transient operating state in the high-load range upon accelerator pedal depression. The engine speed Ne is assumed to remain the same. While the accelerator pedal is depressed during a time period from instant t1 to instant t3, the target intake air amount tV is calculated from the accelerator opening APO. Then, the static target operation angle tEVENT0 and the static target maximum lift phase tCENTER are given based on the target intake air amount tV as indicated by a line B1 and a line C1 of FIG. 18, respectively. If the static target operation angle tEVENT0 is kept adopted as the final target operation angle tEVENT, the actual maximum lift phase rCENTER lags behind the target maximum lift phase tCENTER due to the operational delay of second valve control mechanism 6 and changes along a line C2 of FIG. 18. As a result, the engine torque changes along a line D1 of FIG. 18.

The target operation angle correction process is thus performed during a time period from instant t2 and instant t4 in which engine 1 is judged as being in the transient operating state in the high-load range upon satisfaction of the condition of (tCENTER−rCENTER)≧errCENTER. The corrected target operation angle tEVENTK may become excessively large as indicated by a line B2 of FIG. 18. Such an excessively large target operation angle tEVENTK contrarily reduces the intake air amount and thereby lowers the engine torque as indicated by a line D2 of FIG. 18. In the third embodiment, however, the maximum operation angle limit EVENTLIMIT is set on the corrected target operation angle tEVENTK as indicated by a line B3 of FIG. 18. The target operation angle tEVENT is limited to a heavy line B4 of FIG. 18, thereby obtaining a higher engine torque as indicated by a line D3 of FIG. 18. The torque response of engine 1 can be thus improved more effectively.

Finally, the fourth embodiment will be described with reference to FIGS. 19 to 22. The fourth embodiment is similar to the third embodiment, except that control unit 10 is configured to determine the maximum limit of the corrected target operation angle so as to maximize the intake air amount and avoid the interference between intake valve 3 and piston in consideration of the operational delay of first valve control mechanism 5.

Figure 19:
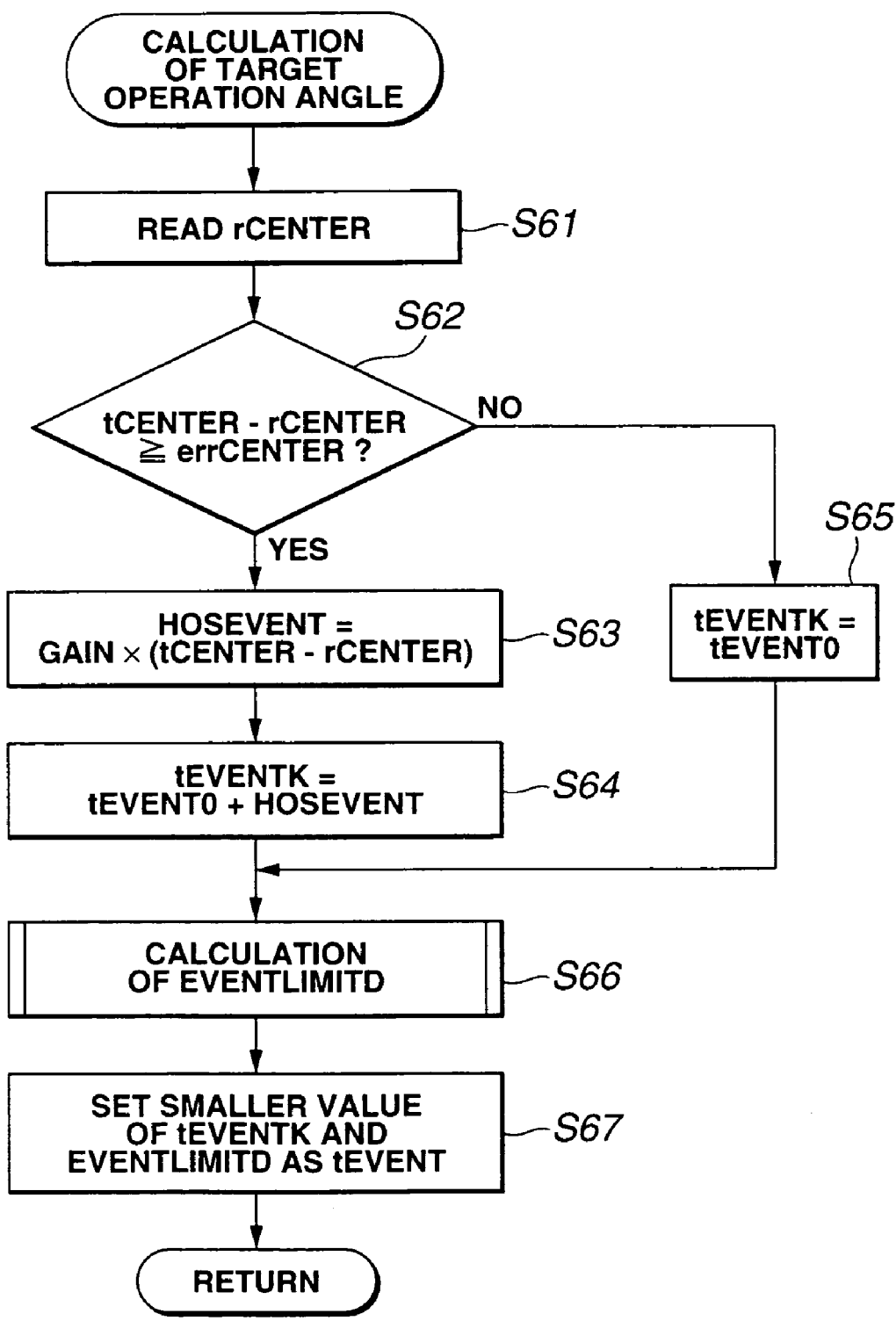
FIG. 19 is a flowchart for the calculation of a target intake valve operation angle according to a fourth embodiment of the present invention.

The calculation of the target operation angle is carried out as shown in FIG. 19 in the fourth embodiment. In step S61, control unit 10 reads the current actual maximum lift phase rCENTER. In step S62, control unit 10 compares an phase deviation between the current actual maximum lift phase rCENTER and the current target maximum lift phase tCENTER with a predetermined threshold value errCENTER to determine whether the phase deviation is larger than or equal to the threshold value errCENTER. If (tCENTER−rCENTER)≧errCENTER (YES in step S62), control unit 10 judges that engine 1 is in the transient operating state in the high-load range and determines a correction value HOSEVENT by multiplying the phase deviation (tCENTER−rCENTER) by a predetermined gain factor in step S63. In step S64, control unit 10 determines a corrected target operation angle tEVENTK by adding the correction value HOSEVENT to the static target operation angle tEVENT0. If (tCENTER−rCENTER)<errCENTER (NO in step S62), control unit 10 determines the static target operation angle tEVENT0 as a corrected target operation angle tEVENTK in step S65. In step S66, control unit 10 calculates a maximum operation angle limit EVENTLIMITD by the after-mentioned procedure. In step S67, control unit 10 makes a comparison between the corrected target operation angle tEVENTK and the maximum operation angle limit EVENTLIMITD and selects the smaller value of the corrected target operation angle tEVENTK and the maximum operation angle limit EVENTLIMITD as a final target operation angle tEVENT.

Figure 20:
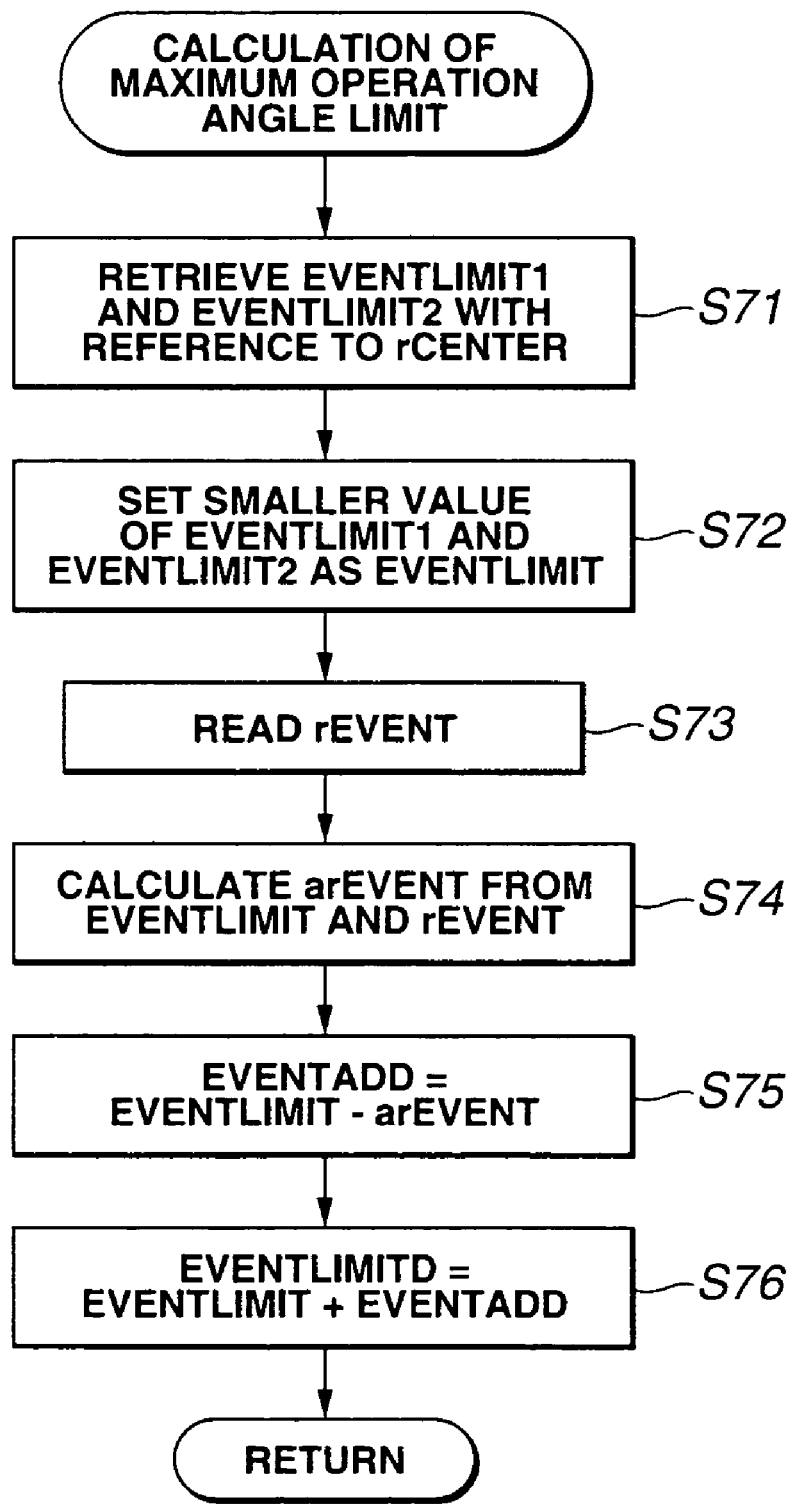
FIG. 20 is a flowchart for the calculation of a maximum valve operation angle limit according to the fourth embodiment of the present invention.

The calculation of the maximum operation angle limit is carried out as shown in FIG. 20 in the fourth embodiment. In step S71, control unit 10 retrieves first and second maximum operation angle limits EVENTLIMIT1 and EVENTLIMIT2 from tables or maps, respectively, with reference to the current actual maximum lift phase rCENTER. The first maximum operation angle limit EVENTLIMIT1 corresponds to an operation angle at which the intake air amount is maximized in the current maximum lift phase, whereas the second maximum operation angle limit EVENTLIMIT2 corresponds to a largest operation angle at which the interference between intake valve 3 and piston can be avoided in the current maximum lift phase. Although the first and second maximum operation angle limits EVENTLIMIT1 and EVENTLIMIT2 are determined based on the actual maximum lift phase rCENTER in the fourth embodiment, it may be more desirable to determine the maximum operation angle limits EVENTLIMIT1 and EVENTLIMIT2 based on both of the actual maximum lift phase rCENTER and the engine speed Ne. In step S72, control unit 10 makes a comparison between the first and second operation angle limits EVENTLIMIT1 and EVENTLIMIT2 and determines the smaller value of the first and second operation angle limits EVENTLIMIT1 and EVENTLIMIT2 as a static maximum operation angle limit EVENTLIMIT. In step S73, control unit 10 reads the current actual operation angle rEVENT. In step S74, control unit 10 calculates an estimated operation angle arEVENT based on the current actual operation angle rEVENT and the static maximum operation angle limit EVENTLIMIT. The estimated operation angle arEVENT corresponds to an operation angle estimated, in consideration of the operational delay of first valve control mechanism 5, to be achieved in the next cycle of the feedback control by giving the static maximum operation angle limit EVENTLIMIT as the final target operation angle. In step S75, control unit 10 determines an add value EVENTADD responsive to the operational delay of first valve control mechanism 5 by subtracting the estimated operation angle arEVENT from the static maximum operation angle limit EVENTLIMIT. Instep S76, control unit 10 calculates as a final maximum operation angle limit a dynamic maximum operation angle limit EVENTLIMITD by adding the add value EVENTADD to the static maximum operation limit EVENTLIMIT.

Figure 21:
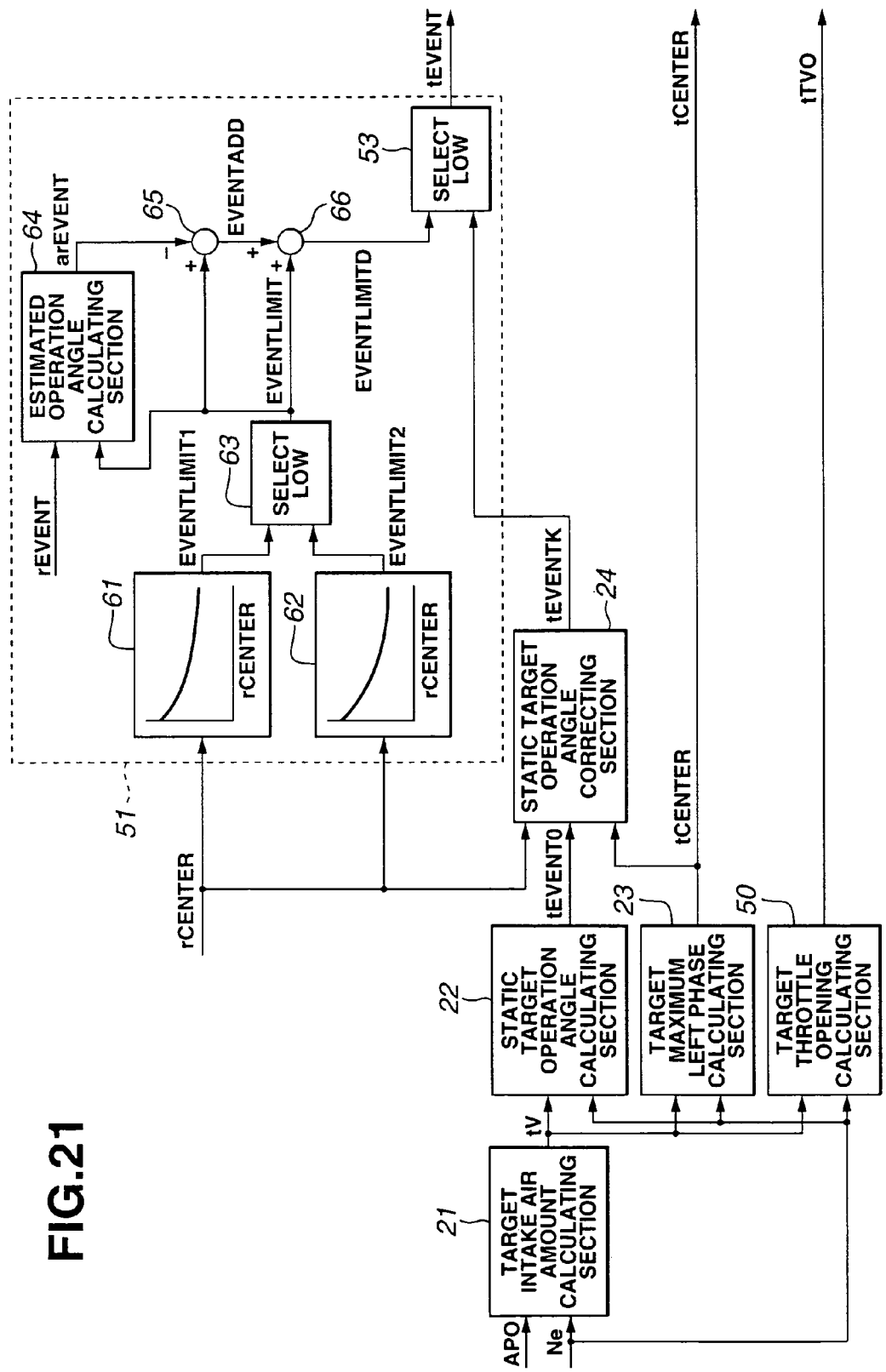
FIG. 21 is a functional diagram of an intake valve control system according to the fourth embodiment of the present invention.

The functions of control unit 10 of the fourth embodiment are indicated in FIG. 21. The target intake air amount tV, the static target operation angle tEVENT0, the static target maximum lift phase tCENTER and the target throttle opening tTVO are calculated by means of target intake air amount calculating section 21, static target operation angle calculating section 22, target maximum lift phase calculating section 23 and target throttle opening calculating section 50, respectively, in the same manner as in the third embodiment. The corrected target operation angle tEVENTK is calculated from the static target operation angle tEVENT0 by means of static target operation angle correcting section 24 when engine 1 is judged as being in the transient operating state in the high-load range, in the same manner as in the third embodiment. The maximum operation angle limit EVENTLIMITD is set on the corrected target operation angle tEVENTK by means of operation angle limiting section 51 as follows. The first and second maximum operation angle limits EVENTLIMIT1 and EVENTLIMIT2 are outputted by blocks 61 and 62, respectively. In the fourth embodiment, block 61 stores therein the table or map defining the operation angle at which the intake air amount becomes maximized with respect to the maximum lift phase and retrieves the first maximum operation angle limit EVENTLIMIT1 from the table in reference to the current actual maximum lift phase rCENTER; whereas block 62 stores therein the table or map defining the largest operation angle at which the interference between intake valve 3 and piston can be avoided with respect to the maximum lift phase and retrieves the second maximum operation angle limit EVENTLIMIT2 from the table in reference to the current actual maximum lift phase rCENTER. As mentioned above, it is alternatively possible to store the tables or maps defining the operation angle at which the intake air amount becomes maximized and the largest operation angle at which the interference between intake valve 3 and piston can be avoided, respectively, with respect to the maximum lift phase and the engine speed and retrieve the first and second maximum operation angle limits EVENTLIMIT1 and EVENTLIMIT2 from the respective tables or maps in reference to the current actual maximum lift phase rCENTER and the current engine speed Ne. The static maximum operation angle limit EVENTLIMIT is set at the smaller value of the first and second maximum operation angle limits EVENTLIMIT1 and EVENTLIMIT2 by means of block 63. The estimated operation angle arEVENT is calculated from the current actual operation angle rEVENT and the static maximum operation angle limit EVENTLIMIT by means of estimated operation angle calculating section 64. The add value EVENTADD responsive to the operational delay of first valve control mechanism 5 is determined by subtracting the estimated operation angle arEVENT from the static maximum operation angle limit EVENTLIMIT at subtracter 65. The dynamic maximum operation angle limit EVENTLIMITD is determined by adding the add value EVENTADD to the static maximum operation angle limit EVENTLIMIT at adder 66. Finally, the corrected target operation angle tEVENTK is limited to the dynamic maximum operation angle limit EVENTLIMITD and below by means of block 53, thereby providing the final target operation angle tEVENT.

Figure 22:
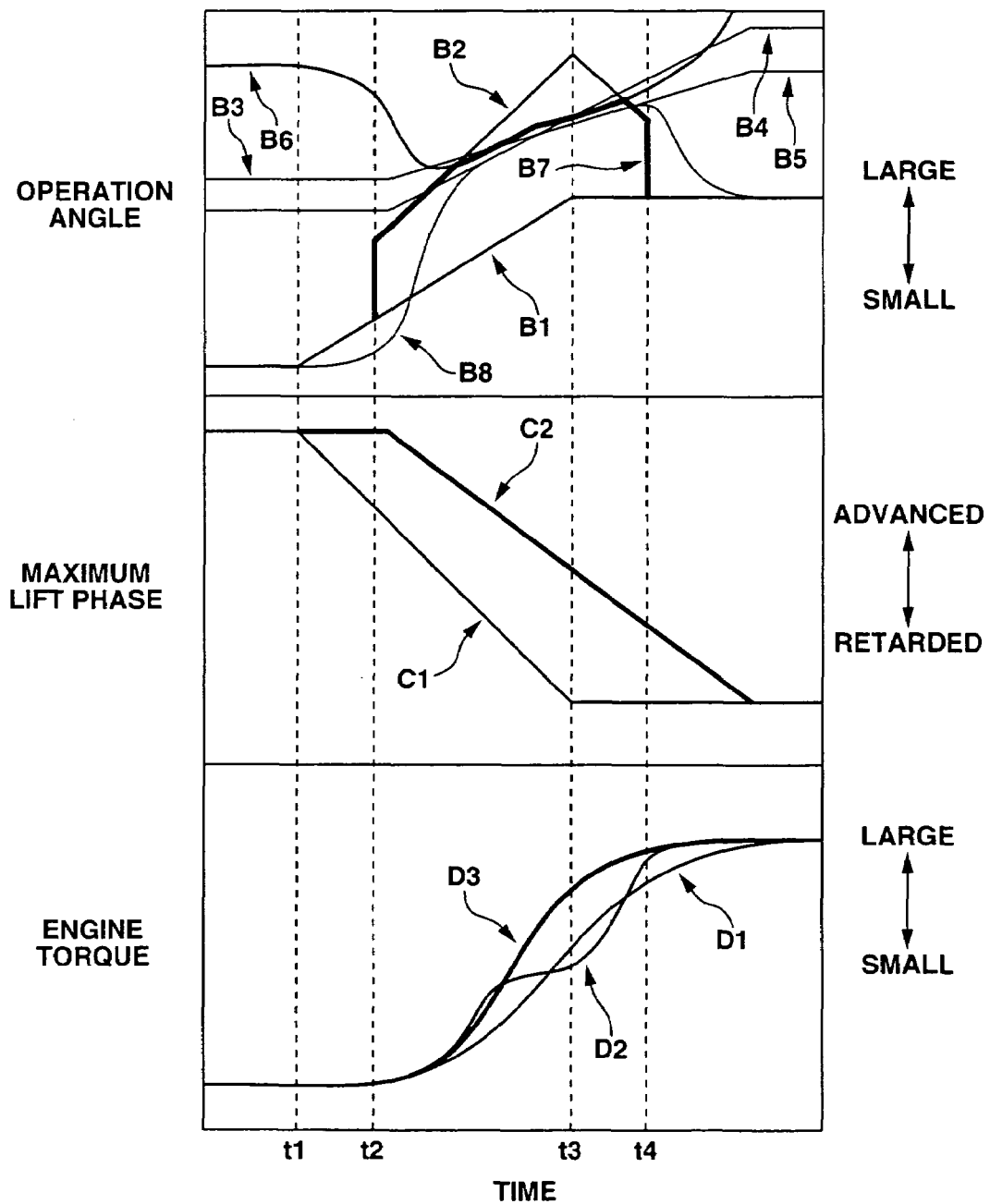
FIG. 22 is a timing chart of target intake valve operation angle correction process in a transient operating state according to the fourth embodiment of the present invention.

The above target operation angle correction process is effected as shown in FIG. 22 in the fourth embodiment, in a case where engine 1 comes into the transient operating state in the high-load range upon accelerator pedal depression. The engine speed Ne is assumed to remain the same. While the accelerator pedal is depressed during a time period from instant t1 to instant t3, the target intake air amount tV is calculated from the accelerator opening APO. Then, the static target operation angle tEVENT0 and the static target maximum lift phase tCENTER are given based on the target intake air amount tV as indicated by a line B1 and a line C1 of FIG. 22, respectively. If the static target operation angle tEVENT0 is kept adopted as the final target operation angle tEVENT, the actual maximum lift rCENTER phase lags behind the target maximum lift phase tCENTER due to the operational delay of second valve control mechanism 6 and changes along a line C2 of FIG. 22. As a result, the engine torque changes along a line D1 of FIG. 22.

The target operation angle correction process is thus performed during a time period from instant t2 and instant t4 in which engine 1 is judged as being in the transient operating state in the high-load range upon satisfaction of the condition of (tCENTER−rCENTER)≧errCENTER. The corrected target operation angle tEVENTK may become excessively large as indicated by a line B2 of FIG. 22. Such an excessively large target operation angle tEVENTK contrarily reduces the intake air amount and thereby lowers the engine torque as indicated by a line D2 of FIG. 22. In the fourth embodiment, however, the first and second maximum operation angle limits EVENTLIMIT1 and EVENTLIMIT2 are set as indicated by a line B3 and a line B4 of FIG. 22, respectively. The smaller value of the first and second maximum operation angle limits EVENTLIMIT1 and EVENTLIMIT2 is determined as the static maximum operation angle limit EVENTLIMIT. The static maximum operation angle limit EVENTLIMIT changes along a line B5 of FIG. 22. The add value EVENTADD responsive to the operational delay of first valve control mechanism 5 is added to the static maximum operation angle limit EVENTLIMIT to give the dynamic maximum operation angle limit EVENTLIMITD as indicated by a line B6 of FIG. 22. The target operation angle tEVENT is limited to a heavy line B7 of FIG. 22. The actual operation angle rEVENT thus changes along a line B8 of FIG. 22 closely to the static maximum operation angle limit EVENTLIMIT, thereby obtaining a higher engine torque as indicated by a line D3 of FIG. 22. The torque response of engine 1 can be thus improved more effectively.

In the above first to fourth embodiments, it is possible to modify the target operation angle correction process so that the target operation angle is corrected to become decreased when the actual maximum lift phase deviates relatively largely from the target maximum lift phase toward the retarded side. In this case, the gain factor by which the accelerator opening change rate DAPO or the phase deviation (tCENTER−rCENTER) is multiplied for decrease in the target operation angle is set smaller than that for increase in the target operation angle.

The entire contents of Japanese Patent Application. No. 2003-017090 (filed on Jan. 27, 2003) and No. 2003-387476 (filed on Nov. 18, 2003) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:

1. An intake valve control system for an internal combustion engine, comprising:
a first valve control mechanism capable of continuously varying an actual operation angle of an intake valve;
a second valve control mechanism capable of continuously varying an actual maximum lift phase of the intake valve; and
a control unit that operates the first and second valve control mechanisms so as to adjust an intake air amount by controlling the operation angle predominantly in a low-intake range and by controlling the maximum lift phase predominantly in a high-intake range,
the control unit being configured to:
calculate a target operation angle and a target maximum lift phase in accordance with engine operating conditions so that the actual operation angle and the actual maximum lift phase are controlled to the target operation angle and the target maximum lift phase, respectively; and
correct the target operation angle in a transient operating state where the actual maximum lift phase deviates from the target maximum lift phase.

2. An intake valve control system according to claim 1, wherein the target operation angle is corrected to become increased when the actual maximum lift phase deviates from the target maximum lift phase toward an advanced side.

3. An intake valve control system according to claim 1, the control unit is further configured to judge said transient operating state when either parameter of an accelerator opening and a target intake air amount calculated from the accelerator opening is compliant with the high-intake range and a change rate of the parameter is larger than or equal to a threshold value.

4. An intake valve control system according to claim 3, wherein the target operation angle is corrected by adding a correction value responsive to the change rate of the parameter to a static target value of the operation angle.

5. An intake valve control system according to claim 1, wherein the control unit is further configured to judge said transient operating state when a phase deviation between the actual maximum lift phase and the target maximum lift phase is larger than or equal to a threshold value.

6. An intake valve control system according to claim 5, wherein the target operation angle is corrected by adding a correction value responsive to the phase deviation to a static target value of the operation angle.

7. An intake valve control system according to claim 1, wherein the control unit is further configured to:
determine a maximum limit of the corrected target operation angle based on a current value of the actual maximum lift phase; and
limit the corrected target operation angle to the maximum limit and below.

8. An intake valve control system according to claim 7, wherein the maximum limit of the corrected target operation angle is determined as an operation angle at which the intake air amount is maximized in the current actual maximum lift phase.

9. An intake valve control system according to claim 7, wherein the maximum limit of the corrected target operation angle is determined by adding an add value responsive to an operational delay of the first valve control mechanism to an operation angle at which the intake air amount is maximized in the current actual maximum lift phase.

10. An intake valve control system according to claim 7, wherein the maximum limit of the corrected target operation angle is determined as a smaller value of an operation angle at which the intake air amount is maximized in the current actual maximum lift phase and a largest operation angle at which interference between the intake valve and an engine piston is avoidable in the current actual maximum lift phase.

11. An intake valve control system according to claim 10, wherein the maximum limit of the corrected target operation angle is determined by selecting a smaller value of an operation angle at which the intake air amount is maximized in the current actual maximum lift phase and a largest operation angle at which interference between the intake valve and an engine piston is avoidable in the current actual maximum lift phase and adding a add value responsive to an operational delay of the first valve control mechanism to the selected smaller value.

12. An intake valve control system for an internal combustion engine, comprising:
a first valve control mechanism capable of controlling an actual operation angle of an engine intake valve;
a second valve control mechanism capable of controlling an actual maximum lift phase of the intake valve;
means for calculating a static target operation angle and a target maximum lift phase in accordance with engine operating conditions, the static target operation angle varying predominantly over the target maximum lift phase in a low-intake range, the target maximum lift phase varying predominantly over the static target operation angle in a high-intake range;
means for calculating a dynamic target operation angle from the static target operation angle in a transient operating state where the actual maximum lift phase deviates from the target maximum lift phase;
means for selecting the dynamic target operation angle under as a final target operation angle under said transient operating state and setting the static target operation angle as a final target operation angle under a state other than said transient operating state; and
means for operating the first and second valve control mechanisms so as to control the actual operation angle and the actual maximum lift phase to the final target operation angle and the target maximum lift phase, respectively.

13. An intake valve control unit according to claim 12, further comprising:
means for reading an operation parameter and a change rate thereof, the parameter being either an accelerator opening or a target intake air amount calculated from the accelerator opening; and
means for judging said transient operating state when the parameter and the change rate of the parameter are larger than or equal to respective threshold values.

14. An intake valve control unit according to claim 12, further comprising:
means for determining a phase deviation between the actual maximum lift phase and the target maximum lift phase; and
means for judging said transient operating state when the phase deviation is larger than or equal to a threshold value.

15. An intake valve control unit according to claim 12, further comprising means for setting a maximum operation angle limit based on a current value of the actual maximum lift phase,
wherein said selecting means selects a smaller value of the dynamic target operation angle and the maximum operation angle limit as the final target operation angle under said transient operating state.

16. An intake valve control method for an internal combustion engine, the engine having a first valve control mechanism capable of controlling an actual operation angle of an engine intake valve and a second valve control mechanism capable of controlling an actual maximum lift phase of the intake valve, the method comprising:
- calculating a static target operation angle and a target maximum lift phase in accordance with engine operating conditions, the static target operation angle varying predominantly over the target maximum lift phase in a low-intake range, the target maximum lift phase varying predominantly over the static target operation angle in a high-intake range;
- calculating a dynamic target operation angle from the static target operation angle in a transient operating state where the actual maximum lift phase deviates from the target maximum lift phase;
- selecting the dynamic target operation angle under as a final target operation angle under said transient operating state and setting the static target operation angle as a final target operation angle under a state other than said transient operating state; and
- operating the first and second valve control mechanisms so as to control the actual operation angle and the actual maximum lift phase to the final target operation angle and the target maximum lift phase, respectively.

17. An intake valve control method according to claim 16, wherein the dynamic target operation angle becomes larger when the actual maximum lift phase deviates from the target maximum lift phase toward an advanced side.

18. An intake valve control method according to claim 16, further comprising:
- reading an operation parameter and a change rate thereof, the parameter being either an accelerator opening or a target intake air amount calculated from the accelerator opening; and
- judging said transient operating state when the parameter and the change rate of the parameter are larger than or equal to respective threshold values.

19. An intake valve control method according to claim 16, further comprising:
- determining a phase deviation between the actual maximum lift phase and the final target maximum lift phase; and
- judging said transient operating state when the phase deviation is larger than or equal to a threshold value.

20. An intake valve control method according to claim 16, further comprising setting a maximum operation angle limit based on a current value of the actual maximum lift phase,
- wherein, in said selecting, a smaller value of the dynamic target operation angle and the maximum operation angle limit is selected as the final target operation angle under said transient operating state.

* * * * *